United States Patent
Mura et al.

[11] Patent Number: 5,371,860
[45] Date of Patent: Dec. 6, 1994

[54] PROGRAMMABLE CONTROLLER

[75] Inventors: Joji Mura, Neyagawa; Akira Yabuta, Ashiya; Tadaharu Kitadou, Moriguchi; Minoru Kuroda, Osaka, all of Japan

[73] Assignee: Matsushita Electric Works, Ltd., Osaka, Japan

[21] Appl. No.: 678,730

[22] Filed: Apr. 1, 1991

[30] Foreign Application Priority Data

Mar. 30, 1990 [JP] Japan .................................. 2-85522

[51] Int. Cl.$^5$ .................. G06F 9/38; G06F 13/00; G06F 15/16
[52] U.S. Cl. .................. 395/325; 364/926.93; 364/927.92; 364/931.1; 364/931.49; 364/937.1; 364/944.4; 364/947; 364/949.2; 364/DIG. 2; 395/800
[58] Field of Search .................. 395/375, 800, 325

[56] References Cited

U.S. PATENT DOCUMENTS

| | | | |
|---|---|---|---|
| 4,694,419 | 9/1987 | Okamoto et al. | 395/375 |
| 4,799,150 | 1/1989 | Bui . | |
| 4,870,614 | 9/1989 | Qustse | 395/375 |
| 4,943,915 | 7/1990 | Wilhelm et al. | 395/375 |

FOREIGN PATENT DOCUMENTS

| | | |
|---|---|---|
| 0174230 | 3/1986 | European Pat. Off. . |
| 0299075 | 1/1989 | European Pat. Off. . |
| WO8702800 | 5/1987 | WIPO . |

OTHER PUBLICATIONS

A. J. Van De goor, "Computer Architecture and Design", 1989, Addison–Wesley Publishing Co., pp. 424–426, section 14.8.1.

*Primary Examiner*—Parshotam S. Lall
*Assistant Examiner*—Ayni Mohamed
*Attorney, Agent, or Firm*—Stevens, Davis, Miller & Mosher

[57] ABSTRACT

A programmable controller includes a main processor connected to I/O and peripheral devices for sequential control thereof in a programmed manner. The main processor is associated with a system memory which stores an operating system for the main processor as well as provides a work area used in the operation thereof. A source instruction memory is provided to store a source program for control of the I/O and peripheral devices. The source program is compiled by the main processor into a program including corresponding reduced instructions and stored in an coprocessor instruction memory. A coprocessor is included to retrieve the instructions from the coprocessor instruction memory to execute the instructions in a pipeline mode and in parallel with the execution of the main processor. A data memory is provided for instruction execution of the coprocessor. The main processor and the coprocessor are operatively interconnected by means of a peripheral controller which has address and data buses associated respectively with the main processor and the coprocessor. The peripheral controller is configured to transfer data directly between the system memory and data memory by a direct-memory access [DMA] prior to the start of the parallel processing and to separate the buses with the main processor from those with the coprocessor upon completion of the DMA data transfer to enable the parallel processing at the main processor and the coprocessor.

5 Claims, 18 Drawing Sheets

<SOURCE INSTRUCTION>

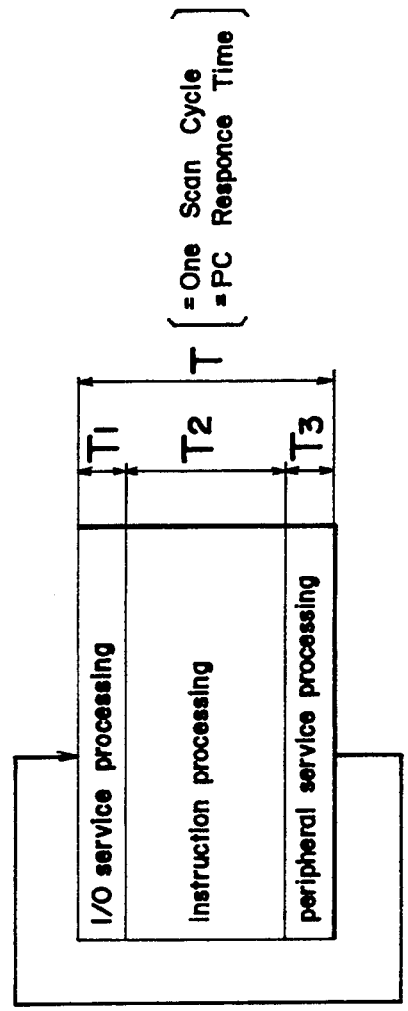

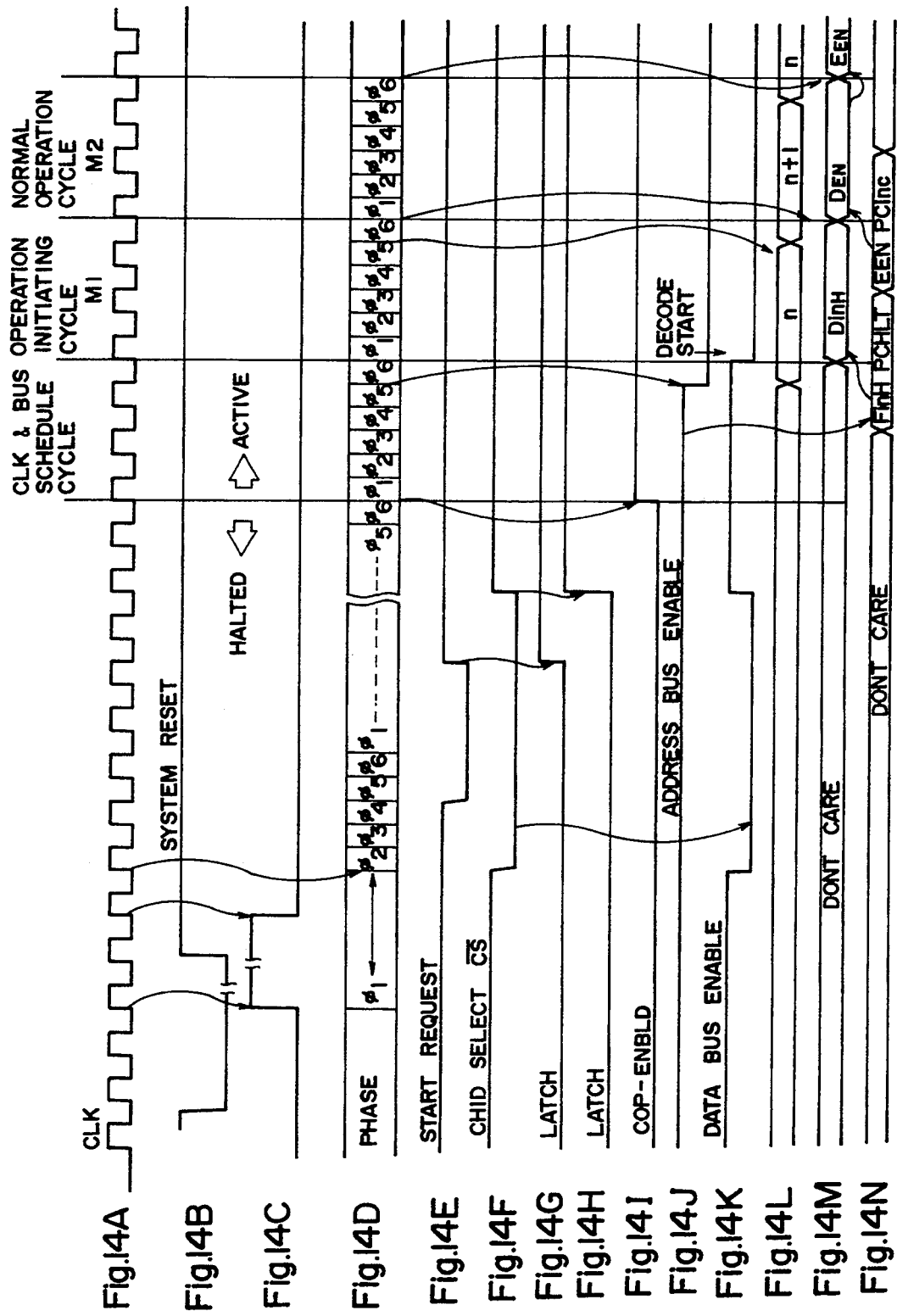

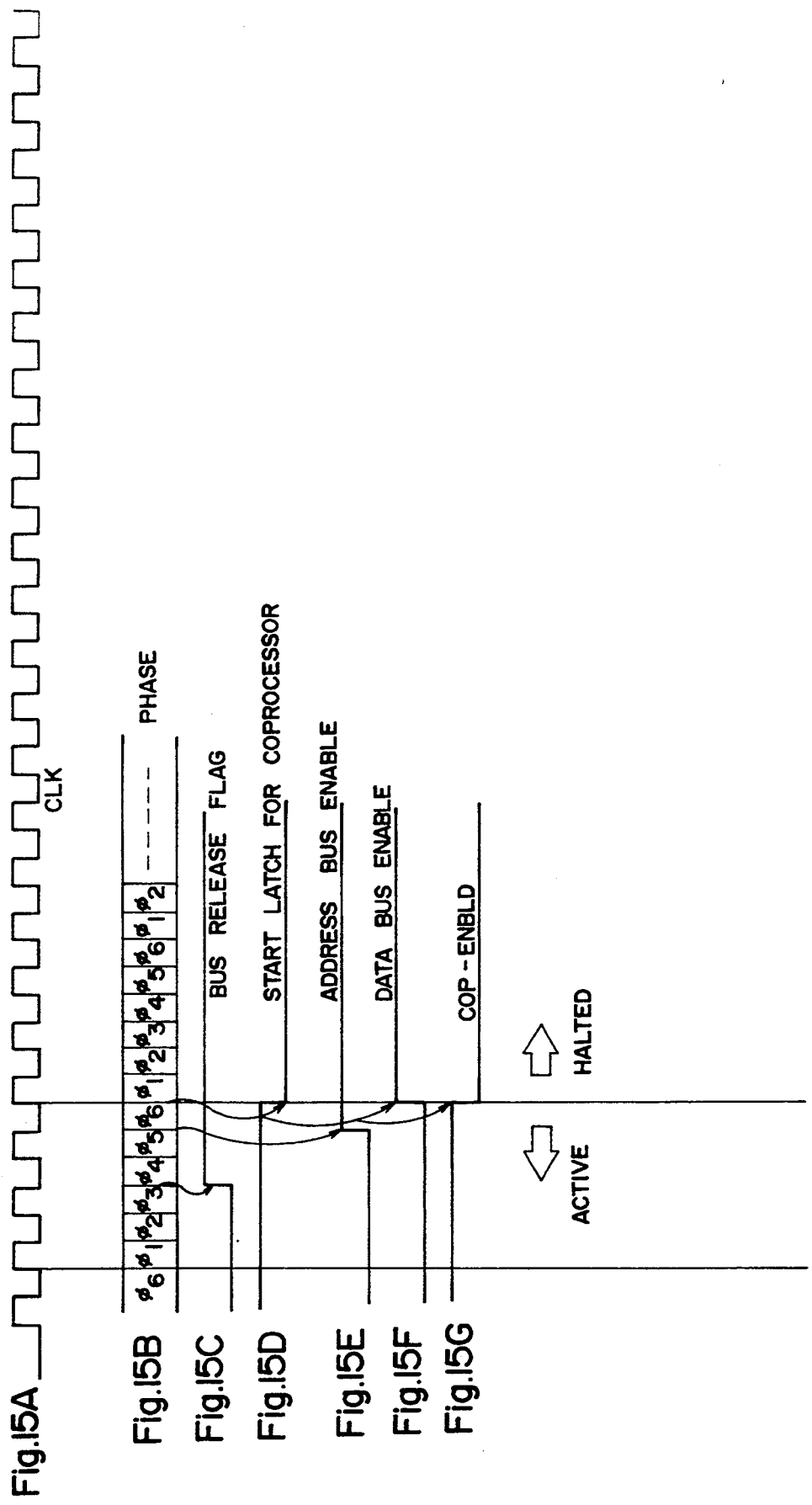

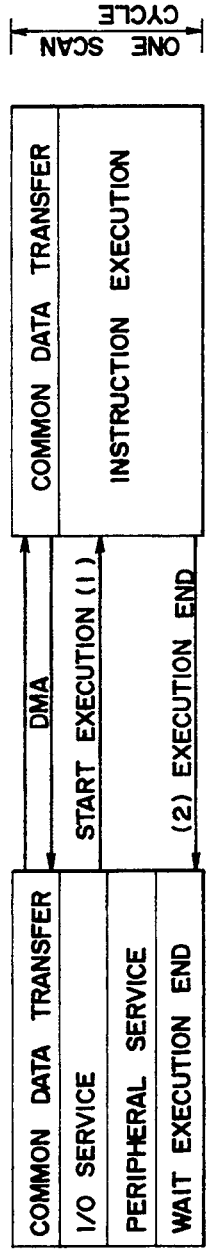

Fig.20
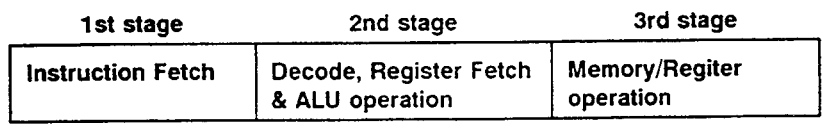
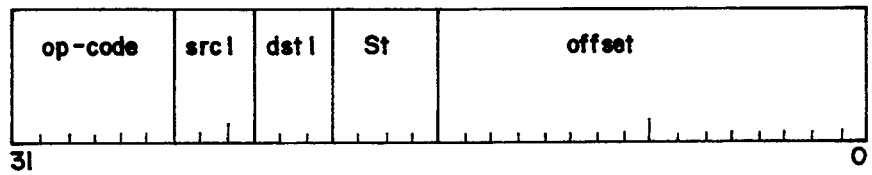
Fig.21A
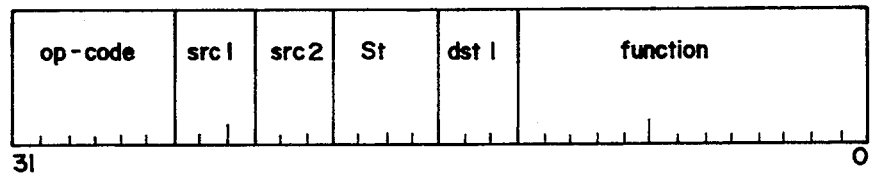
Fig.21B
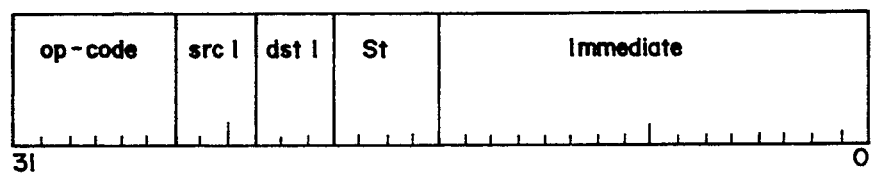
Fig.21C
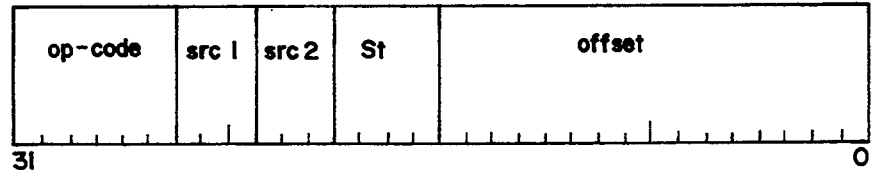
Fig.21D

PROGRAMMABLE CONTROLLER

BACKGROUND OF THE INVENTION

1. Field of the Invention

The present invention is directed to a programmable controller, and more particularly to such a programmable controller capable of executing complicate instructions in addition to fundamental sequential control instructions for operation of associated I/O and peripheral devices.

2. Description of the Prior Art

In recent years there have been a growing demand for programmable controllers which can be utilized in many application fields where a great amount of data are to be processed. To this end the programmable controllers are required to execute a complicate program in order to handle the increased amount of data for achieving a sophisticated control over associated I/O and peripheral devices. In other words, as the sophisticated control are required, the program itself becomes more complicated so as to include, in addition to "basic instructions" for sequential control of the I/O devices, many "applied instructions" for processing of the great amount of the data such as by arithmetic and logic operations. However, as the number of such applied instructions becomes greater, the programmable controller has to wait the completion of the instruction executions before accessing the I/O devices, resulting in a critical delay in response. That is, the programmable controller in which the instruction execution is carried out in a cyclic scan mode, there has been a considerably increased scan time for the execution of the instructions, which fails to give a real-time response of practically acceptable level. In addition, it is also required in keeping the real-time response to use the applied instructions which themselves can be rapidly executed in the programmable controller. Further, there is a trend that the program becomes more and more complicated with attendant increase in the program length or size in order to attain the sophisticated control. To compress the program size as well as to make such complicated program readily understandable by the user, the applied instruction itself becomes more and more complex to contain more than several words. In view of program development efficiency, there is expected a growing tendency to use a high-level language, for example, a SFC (sequence functional chart) language with a readily understandable program rather than conventional assembly languages with mnemonic operation codes because the use of the assembly language may involve awkward debugging operations. Consequently, the programmable controllers are increasingly being called upon to keep real-time response capability for different high-level languages that the user prefers. In other words, it is essential for the programmable controllers performing sophisticated controls to perform execution of the complex applied instructions as fast as possible and to have design flexibility to different high-level languages.

The prior art programmable controllers can be classified into the following two types depending upon the modes of handling the basic and applied instructions in obtaining fast execution of the instruction. Prior to proceeding the description, it is confirmed that the "applied instruction" is defined in this text to require a multi-bit operation for data processing in order to store an input data temporarily into a memory, to transfer the data into another memory, to perform add/subtract/multiply/divide operations, or to perform data conversion, while the "basic instruction" is defined to refer to a single-bit operation including a logical operation in order to input and output a control signal from and to the I/O devices for monitoring and actuating the devices, and to obtain logical AND/OR output.

1) Separate processing mode

The basic instructions which account for a large proportion of a user program is processed by a specifically designed hardware logic, while the applied instructions are software-processed at a general CPU; and 2) Improved separate processing mode Large proportion of the applied instructions are processed also by a specifically designed hardware logic which is controlled by an additional processor (coprocessor) relying upon a large number of microcodes or microprograms.

From a viewpoint of enhancing processing efficiency, the programmable controller operating in the above mode 2) is found to be advantageous. The programmable controller having such concept has been proposed in U.S. Pat. No. 4,694,419. However, in the prior art programmable controller relying upon the microcodes for processing the applied instructions, the number of microcodes will increase greatly as the applied instruction becomes more and more complex, necessitating a huge memory space for the microcodes as well as a correspondingly complicated control logic which should be implemented to include FIFO memory and an instruction queue into an architecture under the limitations of the instructions. As illustrated in FIG. 1 the prior art programmable controller can be shown in a schematic diagram to comprise a source instruction memory 10 storing a source program including complex applied instructions in addition to basic instructions, a microcode memory 11 storing microprogram associated with the applied instructions, a main processor 12, a system memory 13 storing an operating system for the main processor 12 and providing a work area utilized by the main processor 12, a coprocessor 14, and a data memory 15 utilized by the coprocessor 14. An I/O and peripheral interface 16 is provided to actuate associated I/O devices and peripheral devices under the control of the main processor 12. The main processor 12 is responsible for operation of the coprocessor 14. The coprocessor 14 is provided to read instructions directly from the source instruction memory 10 and then fetch suitable information from the microcode memory 11 in order to execute the instructions, the result of which is passed to the main processor 12 for control of the I/O and peripheral devices. These units are interconnected by means of address and data buses B1 to B4.

In the meanwhile, the instructions are preferably pipelined to obtain a high-speed processing at the coprocessor 14. Such pipeline processing is most efficient when the instruction fetch, decode and execution stages are arranged to occur continuously. However, with the prior programmable controller using the instructions relying upon the microcodes, the complex instructions may requires two or more words per one instruction. This means that when a multi-word instruction follows a single word instruction, several stages or cycles are required to fetch the instruction straddling over the several words before execution of that instruction, causing a delay between the execution cycle of the preceding single word instruction and the execution cycle of the following multi-word instruction. Further, in the above prior art configuration, microcode fetch and the computation of the corresponding microcode memory address require at least one cycle in which no instruction fetch is permitted. Therefore, prefetch of a next instruction is only possible during the execution of the current instruction and not during the microcode fetch or address calculation of the microcode memory. These limitations pose considerable hindrance to the high-speed pipelined processing. Furthermore, the prefetch of the multi-word instruction requires a correspondingly large instruction queue memory. When a branch instruction is designated in the multi-word instruction, the instruction or instructions already entered in the instruction queue must be canceled to thereby give a loss cycle or cycles. Therefore, the prior art configuration requires a large instruction queue memory and suffers from the loss cycle or cycles in proportion to the size of the queue memory, which should be avoided from the standpoint of reducing the cost-consuming memory as well as of attaining high speed processing.

The like problems are encountered in a general 32-bit micro processor referred to as CISC [complex instruction set computer] which includes huge microcodes to meet with more and more complex instructions, in which considerable efforts are being made to compress the microcode fetch cycle and to reduce the loss cycles at branch instruction in the pipelined processing.

The instruction processing to be performed in the prior art programmable controller of FIG. 1 will be now explained with regard to "MV" (move) instruction which is one of the applied instructions. The MV instruction is in the form of a 5-words (1 word=16 bits) instruction within the source code which, as shown in FIG. 2, comprises an operation code (op code) MV, lower operand and upper operands related to a source [src] address including operand modification, lower and upper operands related to a destination [dest] address including operand modification. For execution of the instruction, the programmable controller of FIG. 1 is configured to have separate datapaths respectively to the system memory 13 and the data memory 15, and is enabled to prefetch at least one word instruction for pipelining. FIG. 3 illustrates a timing sequence for execution of the instruction consisting of fetch & decode stage [in which instruction fetch, microcode fetch, and decode are performed] and execution & operation stage [in which memory access to data memory 15 as well as computation between registers are performed]. At the first stage, the operation code [op code] for MV instruction is prefetched and decoded in parallel with the execution of the preceding instruction and therefore this fetch & decode stage is not counted in the number of a total bus cycles for completion of the MV instruction. This is true in the execution of the normal instructions except for special instructions such as branch and interrupt instructions which requires to cancel the prefetch. In the next 2 bus cycles, microcode memory address in microcode memory 11 is calculated based upon the prefetched op code and the corresponding microcode is fetched. After the microcode fetch, the sequence proceeds to perform updating of the address of the source instruction memory 10, control of the following fetch, updating of the instruction queue in the coprocessor 14, control of the following microcode fetch, and into execution & operation stage in association with the op code. It is noted at this time that although the microcode fetch is illustrated to be performed in 2 bus cycles, the like microcode fetch may occur simultaneously in the fetch & decode stage from source instruction memory 10 as well as in the execution & operation stage of the instruction. Subsequently, lower and upper operands related to the source information are fetched sequentially in order to determine source [src] address. It is not until the second fetch stage is completed to fetch the upper operand that the coprocessor 14 does not operate to read the corresponding source address data from data memory 15 and transfer that data internally into the coprocessor 14. Thus, the memory access to read and transfer the source address data is performed at the next cycle in parallel with the fetch of the lower operand related to the destination information. Then, the upper operand related to the destination information is fetched and decoded to determine destination [dest] address within a next one cycle. Finally, the coprocessor 14 operates to write back the data retrieved from the source [src] address to the destination [dest] address of the data memory 15 to finish the instruction [MV] in one cycle in parallel with the prefetch of a next instruction op code. Consequently, in order to complete the MV instruction the prior programmable controller requires 7 consecutive cycles beginning from the microcode fetch cycles to the write back data cycle. It is possible with this prior art programmable controller to reduce the bus cycles from 7 to 6 by suitable configuring the op code such that the lower operand fetch can be made in parallel with the microcode fetch & microcode memory address calculation. In any event, however, the prior art programmable controller requires as many as 6 or 7 bus cycles, since the microcode fetch is inevitable for the execution of the instruction. As described in the above, it has been a general practice in the prior art programmable controller to rely upon microcodes for processing a number of complex applied instructions at the coprocessor with the use of the microcode memory in order to meet with changes in specific tasks set by the user, while keeping the internal logic of the coprocessor at a simple configuration and at the same time utilizing a hardware logic for execution of the simple basic instructions which does not need to rely upon the microcodes.

Apart from the high-speed execution of the user program, there should be considered a scan time in order to reduce a total processing time. As shown in FIG. 4, the scan time T in the above prior programmable controller comprises, in addition to a time T2 for execution of the instruction in the source instruction memory, a time T1 for conducting an I/O service, i.e, for access to the I/O devices to be controlled, a time T3 for communication with particular peripheral devices such as computers, program writer, printers or the like. That is, the above three tasks are serially performed within one scan time T. As apparent from FIG. 4, a total scan time T is therefore the sum of the T1, T2, and T3, requiring rather elongated scan time for completing one instruction, which contradicts to the real time response required in the programmable controller.

SUMMARY OF THE INVENTION

The above problems have been eliminated in the present invention which presents an improved programmable controller which incorporates a RISC [reduced instructions set computer] concept to attain high-speed execution for complex instructions and at the same time realizes a parallel processing to effect the instruction execution in parallel with the control of fundamental tasks with regard to I/O and peripheral services for maintaining real-time response, yet having flexible architecture capable of meeting with various high-level source languages. The programmable controller in accordance with the present invention includes a main processor connected to control I/O and peripheral devices in a programmed manner. A system memory is associated with the main processor to store an operating system and provides a work area for the main processor. A source instruction memory is included to store a source program including instructions for control of the I/O and peripheral devices and for data processing. The source program is compiled by means of the main processor into an object program which includes sets of reduced instructions corresponding to the source program instructions and is stored in a coprocessor instruction memory. A coprocessor is provided to receive the instruction from the coprocessor instruction memory to execute the instruction in a pipeline mode and in parallel with the control operation of the main processor to effect a parallel processing. A data memory is also included to be utilized at the instruction execution by the coprocessor. The main processor and the coprocessor are operatively interconnected by a peripheral controller which has address and data buses associated respectively with the main processor and the coprocessor. The peripheral controller is configured to be capable of transferring data directly between the system and data memories by means of a direct-memory access [DMA] prior to the start of the parallel processing and separating the address and data buses leading to the main processor from those leading to the coprocessor upon completion of the DMA data transfer, thereby enabling the parallel processing at the main processor and the coprocessor. Since the coprocessor is responsible for execution of the instructions in the form of reduced instructions which are compiled from the source program, there is no need to rely upon the complex microcodes as seen in the prior art programmable controller, thereby eliminating a time-consuming microcode fetch cycle and at the same time enabling an efficient pipeline processing with such reduced instructions. Also, since the coprocessor operates on the reduced instructions rather than the source instructions, it is readily possible to have an architecture which is not substantially affected by the source program language itself and is easy to comply with addition or modification of the source codes or instructions simply at the compiler stage. Further with the use of the reduced instructions most of which could be one-word instruction, it is readily possible to reduce the number of the pipeline stages, thereby minimizing an instruction queue or FIFO requirement which gives a simple hardware configuration and assures coherent pipelining. Further, with the parallel processing in which the instruction execution is carried out at the coprocessor while the fundamental task are carried out at the main processor, total scan time of completing the one processing can be significantly reduced only at an expense of one bus cycle required for the DMA data transfer between the system and data memories prior to the start of the parallel processing.

Accordingly, it is a primary object of the present invention to provide an improved programmable controller which is capable of effecting high-speed processing with minimum bus cycles, yet assuring design flexibility to comply with possible variation in the user program language or source codes.

The coprocessor includes an arithmetic and logic unit [ALU] with a set of general registers temporarily storing information associated with the instruction and a hardware logic comprising a comparator and a pipeline scheduling unit. At the comparator a current instruction is compared with a following instruction fetched in the pipeline mode to provide a schedule-requiring output when these two succeeding instructions are determined to be in such a particular relation as to cause a conflict in using one of the general registers. In response to the schedule-requiring output, the pipeline scheduling unit provides an instruction to the hardware logic so as to stall or delay the cycle of executing the following instruction until the conflict is resolved.

Further, the coprocessor includes more than one input registers and an output register in addition to the set of the general registers. The input registers are provided to store information utilized for execution of the instruction by the ALU, and the output register is to store the result of the instruction processed by the ALU. The comparator compares a current instruction with a following instruction to provide a second schedule-requiring output when these two succeeding instructions are determined to be in such another particular relation as to cause a conflict in using the general registers. In response to the second schedule-requiring output, the pipeline scheduling unit operates to transfer a content of the output register obtained by the operation of the instruction at the ALU to one of the input registers to be immediately available in the execution of the following instruction at the ALU. With these arrangements, it is readily possible to give coherent pipeline dependency only with a minimum exception with regard to the instruction sequence. This contributes to considerably eliminate complicate software tuning in the compiler for settlement of the conflict. Particularly, since the hardware stall is realized by the hardware logic it is no longer necessary to insert a no-op instruction in a particular instruction sequence, which greatly reduces memory requirement and hence the costs of the programmable controller.

It is therefore another object of the present invention to provide an improved programmable controller which is capable of optimizing the pipeline processing with a reduced memory requirement.

These and still other objects and advantages will become more apparent from the following detailed description of the embodiment when taken in conjunction with the attached drawings.

BRIEF DESCRIPTION OF THE DRAWINGS

FIG. 3 is an instruction execution flow of the "MV" operation the system of FIG. 1;

FIG. 4 is a scan cycle diagram indicating a PC (programmable controller) response time T (=one scan cycle) during which one instruction is completed in the system of FIG. 1;

FIGS. 14A-14N are initialization timing diagrams of the coprocessor;

FIG. 15 is a halt sequence timing diagram of the coprocessor;

FIGS. 16A and 16B are diagrams for move [MV] instruction in the source instruction format and in the compiled instruction format;

FIG. 17 is an operation execution flow of the "MV" instruction of FIG. 16B;

FIG. 18 is a scan cycle diagram of the PC (programmable controller) response time T (=one scan cycle) for the system of FIG. 5;

FIG. 20 is a diagram illustrating three major stages for the pipeline instruction execution at the MPU;

FIG. 21, composed of FIGS. 21A to 21D, illustrates the detailed coprocessor instruction formats for the applied instructions;

DETAILED DESCRIPTION OF THE EMBODIMENT

A programmable controller in accordance with the present invention is contemplated to control I/O devices as well as peripheral devices in a programmed manner with an improved capability of data processing. The I/O devices are, for example, relays, sensors or the like to be sequentially controlled or monitored under the surveillance of the program, while the peripheral devices are computers, program writers, printers connected in communication with the programmable controller.

Figure 5:
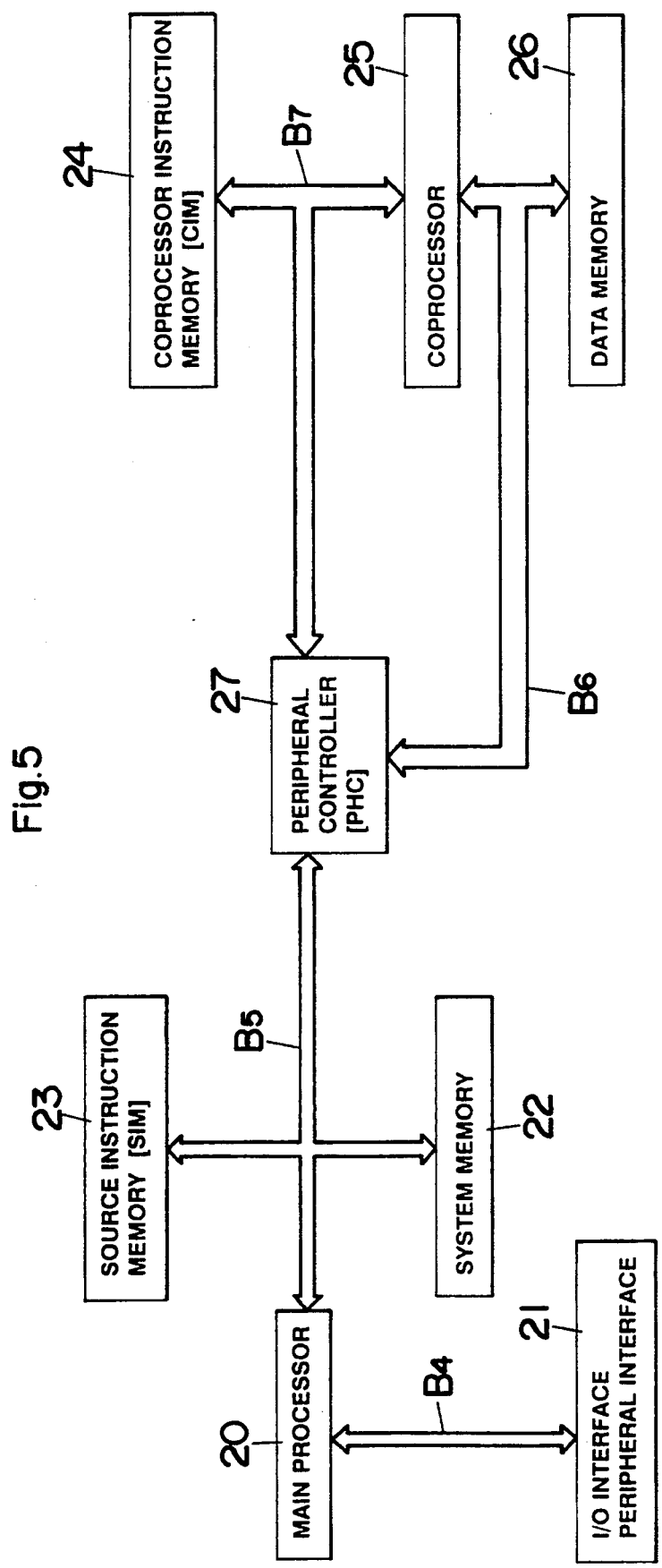
FIG. 5 is a block diagram illustrating a system configuration of a programmable controller in accordance with the present invention.

Referring now to FIG. 5, a programmable controller in accordance with the present invention has a system configuration comprising a main processor 20 connected to an I/O and peripheral interfaces 21 for control of the associated I/O and peripheral devices (not shown). Cooperative with the main processor 20 is a system memory 22 which stores an operating system for the main processor 20 as well as gives a work area therefor. A source instruction memory [SIM] 23 is provided to store a user program written in a source language for processing data required in the control of the controlling I/O devices as well as the peripheral devices. The source language is compiled by the main processor 20 into an object language which is stored in an coprocessor instruction memory [CIM] 24. The compiled object language includes a set of reduced instructions each comprising a 32-bit word in one of predetermined formats, as seen in FIG. 6. Also included is a coprocessor 25 which is responsible for execution of the reduced instructions [hereinafter referred to simply as instructions] from the coprocessor instruction memory CIM 24 in cooperation with a data memory 26 storing data required in the instruction execution at the coprocessor 25. The coprocessor 15 is configured to execute the instruction in parallel processing mode with the processing by the main processor. In order to achieve the parallel processing, a peripheral controller [PHC] 27 is provided to operatively interconnect the main processor 20 and the coprocessor 25. The PHC 27 has a pair of address and data buses B5 and B6 respectively leading to the system memory 22 and the data memory 26 in such a manner as to transfer data therebetween by a direct memory access [DMA] scheme prior to the start of the parallel processing and to separate from each other upon completion of the data transfer, thereby enabling the parallel processing at the main processor 20 and the coprocessor 25. Data buses B4 and B7 are shown respectively for connection between the main processor 20 and the system memory 22 and between the coprocessor 25 and the coprocessor instruction memory 24.

The coprocessor 26 is implemented to have an architecture incorporating the reduced instruction set computer [RISC] concept capable of efficient pipelining for execution of the instructions. Prior to discussing the detailed operation of the coprocessor 26, it is again confirmed that the instructions given to the programmable controller can be classified into the following three types.

1) Basic instructions

Figure 6A:
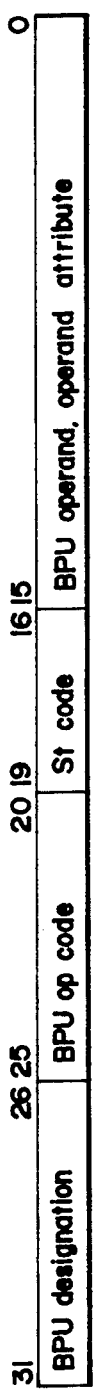
FIGS. 6A to 6C illustrate general types of coprocessor instruction formats for basic instruction, applied instruction, and an extended instruction, respectively.

Primitive instructions that are essential for the operation of programmable controller and require a single bit processing including a logical operation in order to have a relay sequence control. The instruction format for this instruction is shown in FIG. 6A, in which the first 6 bits [26 to 31] are used to designate a bit processing unit (BPU) 50 in the coprocessor 25 to request a single bit processing thereat, the next 6 bits [20 to 25] include an operation code [op code] for the particular basic instruction, and last 15 bits [0 to 15] include operands and operand attributes.

2) Applied instructions

Figure 6B:

Memory-oriented instructions that are added to enable sophisticated controls at the programmable controller and require a multi-bit processing for handling memory data in order to store an input data temporarily into a memory, to transfer the data into another memory, to perform, for example, arithmetic operations, or to perform data conversion. The instruction format for this instruction is shown in FIG. 6B, in which the first 6 bits [26–31] designate an op code (MPU op code) of the particular applied instruction to be executed at multi-bit processing unit (MPU) 60 in the coprocessor 25, the next 6 bits [20–25] include register attributes, and the last 16 bits [0–15] include operands, register attributes, and working flags. The applied instruction formats are further divided into several groups depending upon the types of the required operations, which will be discussed in later.

3) Extended instructions

Figure 6C:
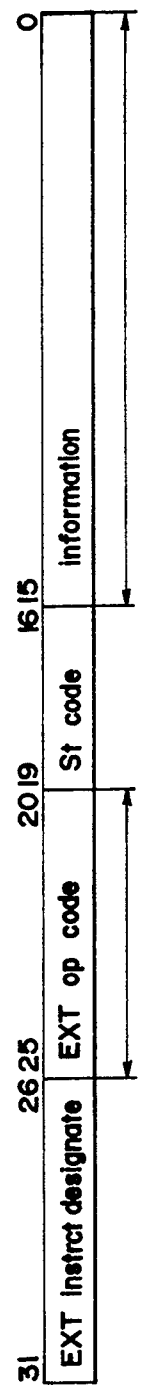
Figure 6D:
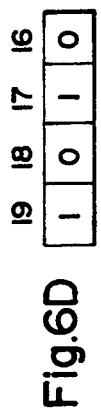
FIG. 6D illustrates a portion of the instruction format utilized to represent a status tag code.

Instructions that are dependent upon a hardware or system configuration for control of the peripheral devices and direct access to the I/O devices, for example, and are required to be processed by the main processor, in contrast to that the basic and applied instructions are executed only by the use of the coprocessor and the memory. The instruction format for this extended instruction is shown in FIG. 6C, in which the first 6 bits [26 to 31] designate an extended instruction (EXT-instruction) to be performed by the main processor 20, the next 6 bits [20–25] include an op code for particular one of the EXT-instructions, and the last 15 bits [0–15] provide a code area for information required for execution of that particular instruction at the main processor 20.

In all of the instruction formats of FIGS. 6A to 6C, 4 bits [16–19] are reserved for a status tag code (ST code) which gives a relation between the address of the source program and the that of compiled object program such that, if an error or interrupt is encountered during the execution of the instructions from the coprocessor instruction memory 24, the address of the corresponding source instruction can be identified, thereby enabling an easy debugging of the source program. For example, the 19th bit of the ST code is utilized to show the last one of a set of reduced instructions which are corresponding to one instruction in the source program when "1" is entered in the 19th bit. And, the remaining three bits in the ST code is utilized to indicate the number of the words constituting the one instruction in the source program.

Figure 7:
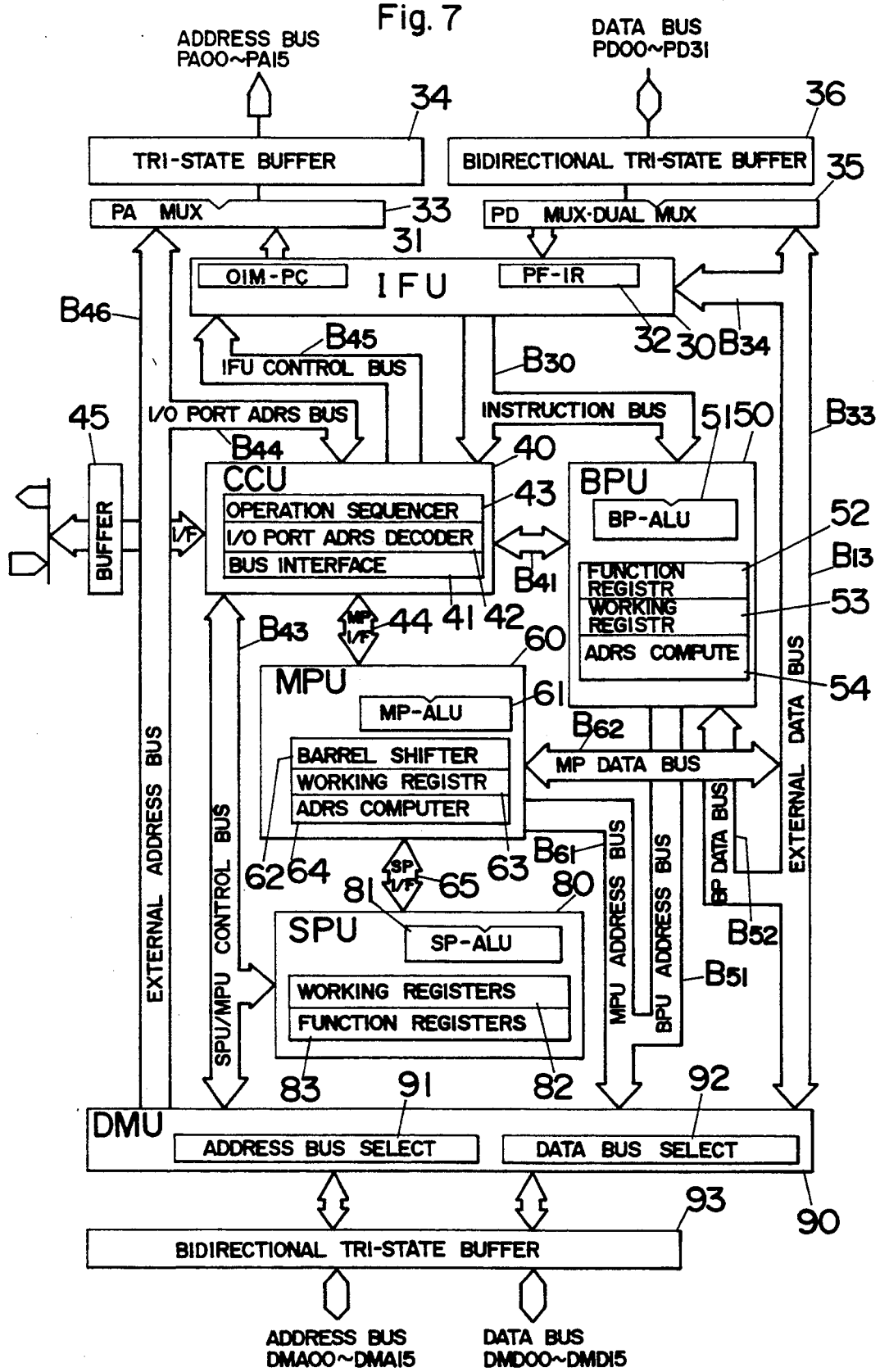
FIG. 7 is an internal block diagram of a coprocessor utilized in the system of FIG. 5.

As shown in FIG. 7, the coprocessor 25 comprises an instruction fetch unit (IFU) 30, a communication control unit (CCU) 40, a data memory access unit (DMU) 90, the bit processing unit (BPU) 50, the multi-bit processing unit (MPU) 60, and a special processing unit (SPU) 80. The IFU 30 is provided to control the fetch of the instructions from the coprocessor instruction memory CIM 24 and includes a 16-bit program counter (CIM-PC) 31 capable of being initialized by the main processor 20 and includes an instruction register (PF-IR) 32. The IFU 30 is connected to address bus PA00-PA15 of the CIM 24 through a multiplexor 33 and a tri-state buffer 34, and connected to address bus PD00–PD32 of the CIM 24 through a bus B32, a multiplexor/dual-multiplexor 35, and a bidirectional tri-state buffer 36. Also, the IFU 30 is connected to an external data bus B33 though a data bus B34, and connected to the CCU 40 and BPU 50 through an instruction bus B30, and further connected to a control bus B45 from the CCU 40.

The CCU 40 includes a bus interface 41 for giving an operation control between the IFU 30, DMU 90, BPU 50, MPU 60 and SPU 80 and for interface with external memory control signal and internal memory buses, an I/O port address decoder 42 for setting privileged registers connected to internal ports and reading the contents thereof, and an operation sequencer 43 for providing control signals to selectively operate the IFU 30, DMU 90, BPU 50, MPU 60 and SPU 80 as well as for receiving the results of the operations at these units to achieve the overall controlled processing. The CCU 40 is connected to BPU 50 through a BPU interface bus B41, to MPU 60 through a MPU interface 44, and to SPU 80 and DMU 90 through a SPU/MPU control bus B43. Also, the CCU 40 is connected to a buffer 20 through which it can receive system information, and connected to an external bus B46 through an I/O port address bus B44.

The DMU 90 is provided to a set stack point and a base address with regard to the data memory 26 for memory access thereto, and is provided with an address bus selector 91 and a data bus selector 92 respectively for selection of the address bus and data bus to the data memory 26. For access to the privileged registers associated with the internal ports of the CCU 40, the DMU 90 is capable of providing an I/O port address output to the CCU 40. Also the DMU 90 is connected through the external address bus B46, multiplexor 33 and tri-state buffer 34 to the address bus PA00–PA15 for the CIM 24, and connected to the external data bus B13. Further, the DMU 90 is connected to a BPU address bus B51 from the BPU 50 and to an MPU address bus B61 from the MPU 60, and is connected through a bidirectional tri-state buffer 93 to address bus DMA0-0–DMA15 and to data bus DMD00–DMD15.

The BPU 50 is responsible for executing the basic instructions contained in the compiled program stored in the coprocessor instruction memory 24 and includes an arithmetic and logic unit (BP-ALU) 51 configured to efficiently execute the basic instructions. Also included are a minimum number of function registers 52 required for the operation at BP-ALU 50, working registers 53 and address calculation section 54 for computing the address of the data memory 26. The BPU 50 is connected to the external data bus B33 through a BP data bus B52.

The MPU 60 is implemented to optimize the execution of the applied instructions contained in the compiled program and has a 32-bit arithmetic and logic unit MP-ALU 61, a barrel shifter 62 capable of operating in 16-bit as well as 32-bit modes, eight 32-bit working registers 63, an address calculation section 64 for computing the address of the data memory 26. The MPU 60 is connected to the external data bus B13 through a MP data bus B62, and to the SPU 90 through an SP interface 65.

The SPU 80 is implemented to execute the particular instructions which cannot be executed at MP-ALU 61 and barrel shifter 62 of the MPU 60 and includes an arithmetic and logic unit (SP-ALU) 81 responsible for executing multiply/divide operations, BCD conversion and BIN conversion, and includes 32-bit and 64-bit working registers 82, latch (not shown) for pipelining and function registers 83.

Operation of thus configured coprocessor 25 will be now discussed with reference to FIGS. 7 and 8. The instruction fetched by the IFU 30 is passed to the CCU 40 where the first 6 bits of the instruction is analyzed to correspond to which one of the three instruction formats of FIGS. 6A to 6C. When the instruction is determined to be of the basic instruction type, i.e., containing the BPU designation at the first 6 bits, the next 6 bit op code (BPU op code) is decoded to give a particular operation code. Upon seeing the particular operation code, the CCU 40 provide to the BPU 50 a BPU execution enable signal to request the instruction execution thereat. When the instruction is determined to be of the applied instruction type, i.e., to have MPU op code in the first 6 bits as shown in FIG. 6B, the CCU 40 provides to the MPU 60 an MPU execution enable signal to request the instruction execution thereat. When the instruction is determined to be of the extended instruction type, the CCU 40 sets a flag indicative of the extended instruction which cannot be executed either at the BPU 50 or MPU 60 and requests to the main processor 20 for executing the extended instruction. The SPU 80 is requested by an SPU execution enable signal which is given from the MPU 60 when the op-code of the applied instruction is interpreted not to be executed at the MPU 60.

Figure 8:
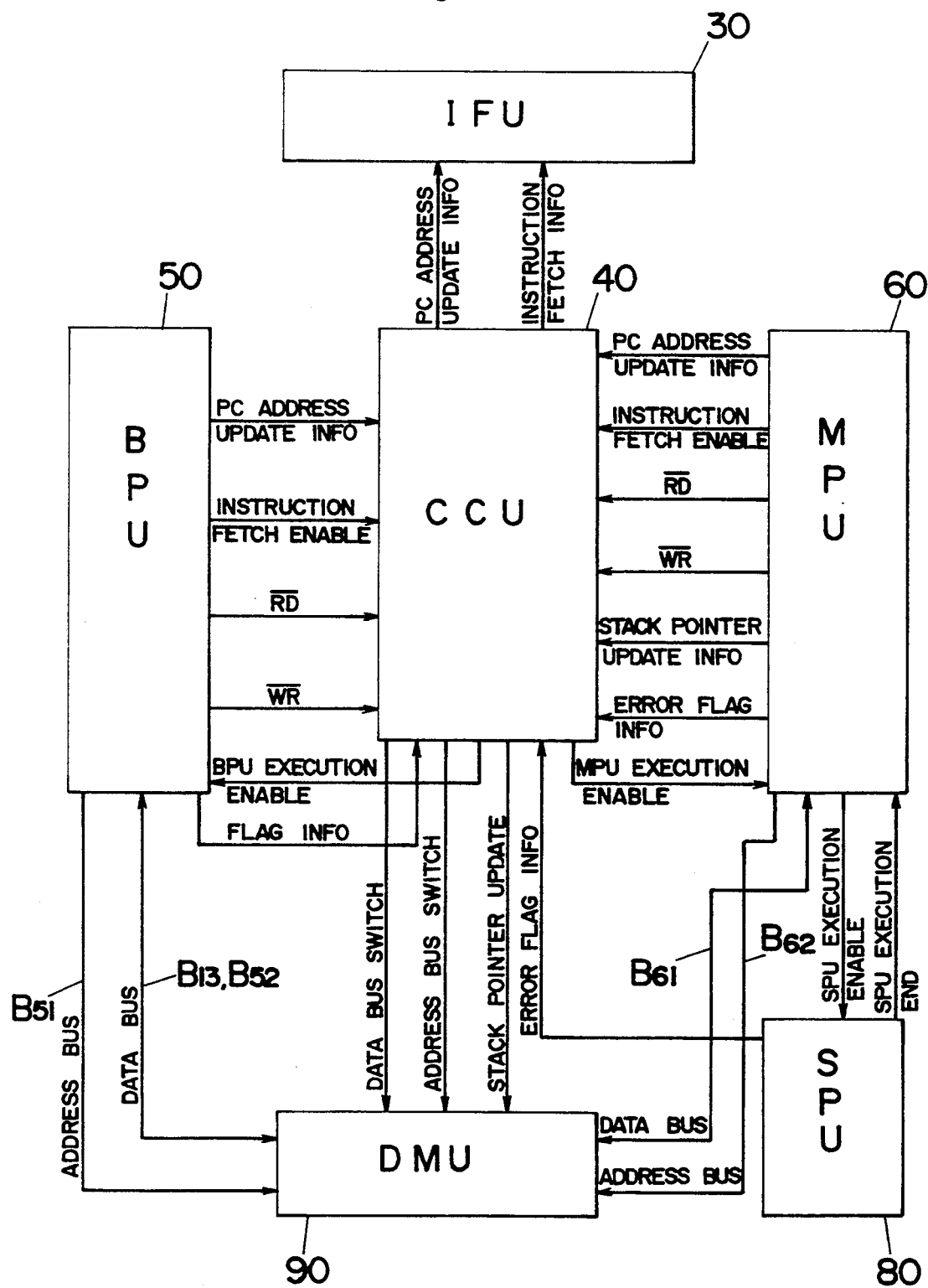
FIG. 8 is a block diagram indicating control signals for the coprocessor.

FIG. 8 illustrates, in addition to the above signals, other signals transmitted between the units in the coprocessor 25 required for instruction execution in the pipeline mode. In order to timely update the CIM-PC 31 and control the latch of PF-IR 32 for the IFU 30, the CCU 40 controls the IFU 30 by giving thereto a PC address update signal and instruction fetch information which are based upon decoded information from the BPU 50 and the MPU 60, and other internal or external exceptional information dependent upon system configuration. The decoded information from the BPU 50 includes a function signal to the BP-ALU 51, an address update information for CIM-PC 31 and an instruction fetch enable signal. Since there are some basic instructions which require several cycles for the execution thereof, instruction fetch or prefetch should be disabled until the execution proceeds to the last cycle in order to maintain the pipeline processing. For this reason, the BPU 50 generates an instruction fetch enable signal at a suitable timing dependent upon the particular basic instruction in order to effect the pipelining. When the instruction fetch is disabled, the CCU 40 interprets the address update inhibiting information from the BPU 50 and delivers that information to the IFU 30 to stop address counting thereat. Also there are some applied instructions which require more than one cycles for the execution thereof, such as multiply and divide operations to be executed at the SPU 80. In this case, the CCU 40 takes the decoded information from the MPU 60 to disable the instruction fetch and stop counting the address of the CIM-PC 31 in the like manner. When, on the other hand, the instruction fetch enable signal is given to the CCU 40 from the BPU 50 or the MPU 60, the CCU 40 controls to update the address of the CIM-PC 31 and request to the IFU 30 to fetch the next instruction. When the BPU 50 or MPU 60 requires an access to the data memory 26, the BPU 50 or MPU 60 provides to the CCU 40 within its execution cycle a read request signal $\overline{RD}$ or write request signal $\overline{WR}$ for reading or writing the data memory 26.

Upon receiving the read request signal $\overline{RD}$ or the write request signal $\overline{WR}$ from the BPU 50 or the MPU 60, the CCU 40 selects the address and data buses for memory access to the data memory 26 in answer to the read or write request from the BPU 50 or the MPU 60. Besides the above described signals and information, there are data bus switch signal, address bus switch signal and stack point update signal from the CCU 40 to the DMU 90, stack pointer update information and error flag information from the MPU 60 to the CCU 40, SPU execution end signal from the SPU 80 to the MPU 60, error flag information from the SPU 80 to the CCU 40, and error flag information from BPU 50 to the CCU 40. The above exceptional system related information includes the fetched EXT-instructions to be executed by the main processor 20, execution errors from the MPU 60 and the SPU 80, or an external interrupt request. Upon detection of such exceptional information, the CCU 40 sets a bus release flag and waits the end of the current execution so that it halts the next execution cycle and requests the main processor 20 to process the information on behalf of the coprocessor 25, during which halted cycle the buses are kept released.

Figure 9:
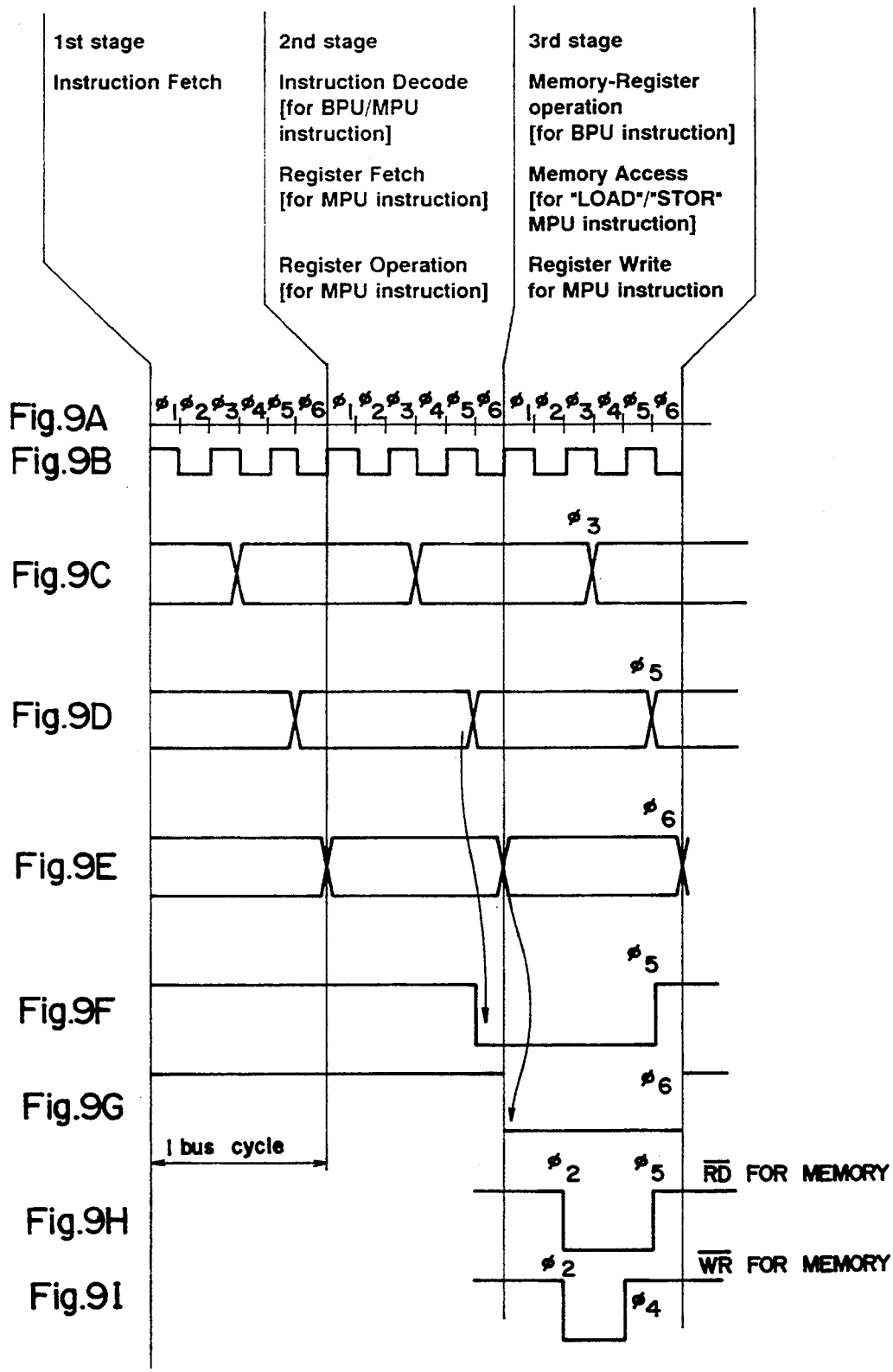
FIG. 9, composed of FIGS. 9A to 9I, is a timing diagram of the coprocessor.

FIG. 9, composed of FIGS. 9A to 9I, illustrates a timing chart of signals seen in the pipelining operation for executing the 32-bit instructions in the coprocessor 25. The instruction execution consists of three stages, i.e., 1st stage for instruction fetch, 2nd stage for instruction decode, and 3rd stage for Memory/Register operation. It should be noted here that the 2nd stage of the pipeline includes, in addition to the instruction decode which is made both for BPU and MPU-related instructions, a register fetch as well as a register operation (arithmetic/logic operation) for MPU-related instructions. Further, the 3rd stage of the pipe line includes memory-register operation for BPU-related instructions and memory access for "LOAD" or "STOR" of the MPU-related instructions, and register write of writing the contents of the output register of the MP-ALU 61 into one of general registers including flag write for MPU-related instructions. Each stage is completed within one bus cycle. Thus, the coprocessor 25 is configured to be capable of processing the BPU and MPU-related instructions in 3-stage pipeline selectively at the BPU 50 and MPU 60 in order to maintain pipeline coherency. In other words, the MPU 60 is provided to process the MPU-related applied instructions on a word-by-word basis as the BPU 50 does the BPU-related basic instructions such that the MPU-related instructions can be successfully pipelined in the 3-stages together with the BPU-related basic instructions. In this sense, the coprocessor 25 can be said to effect multi-processing for the BPU and MPU-related instructions. As shown in FIGS. 9A and 9B, one bus cycle is defined by 3 clock cycles to have 6 phases $\phi 1$ to $\phi 6$. FIG. 9C illustrates a condition of an internal control bus indicative of decoded information from the BPU 50 and MPU 60, and errors, interrupts, or step operation to be controlled by the main processor 20). FIG. 9D illustrates write back of flag registers for CIM-PC 31 and PF-IR 32 of the IFU 30, MPU 60 and SPU 80; output registers for BP-ALU 51, MP-ALU 61 and SP-ALU 81; and address registers for BPU 50 and MPU 60. FIG. 9E illustrates operational information as to function latch of BP-ALU 51, MP-ALU 61 and SP-ALU 81, as well as bus status information as to $\overline{RD}$, $\overline{WR}$, or exceptional information). FIG. 9F illustrates an address enable signal (address output from BPU 50 and MPU 60) for access to the data memory 26, which address enable signal occurs one phase in advance of the memory access. FIG. 9G illustrates a data bus enable signal for access to the data memory 26. FIGS. 9H and 9I illustrate the $\overline{RD}$ signal and $\overline{WR}$ signal for reading or writing of the data of the data memory 26.

Figure 10:
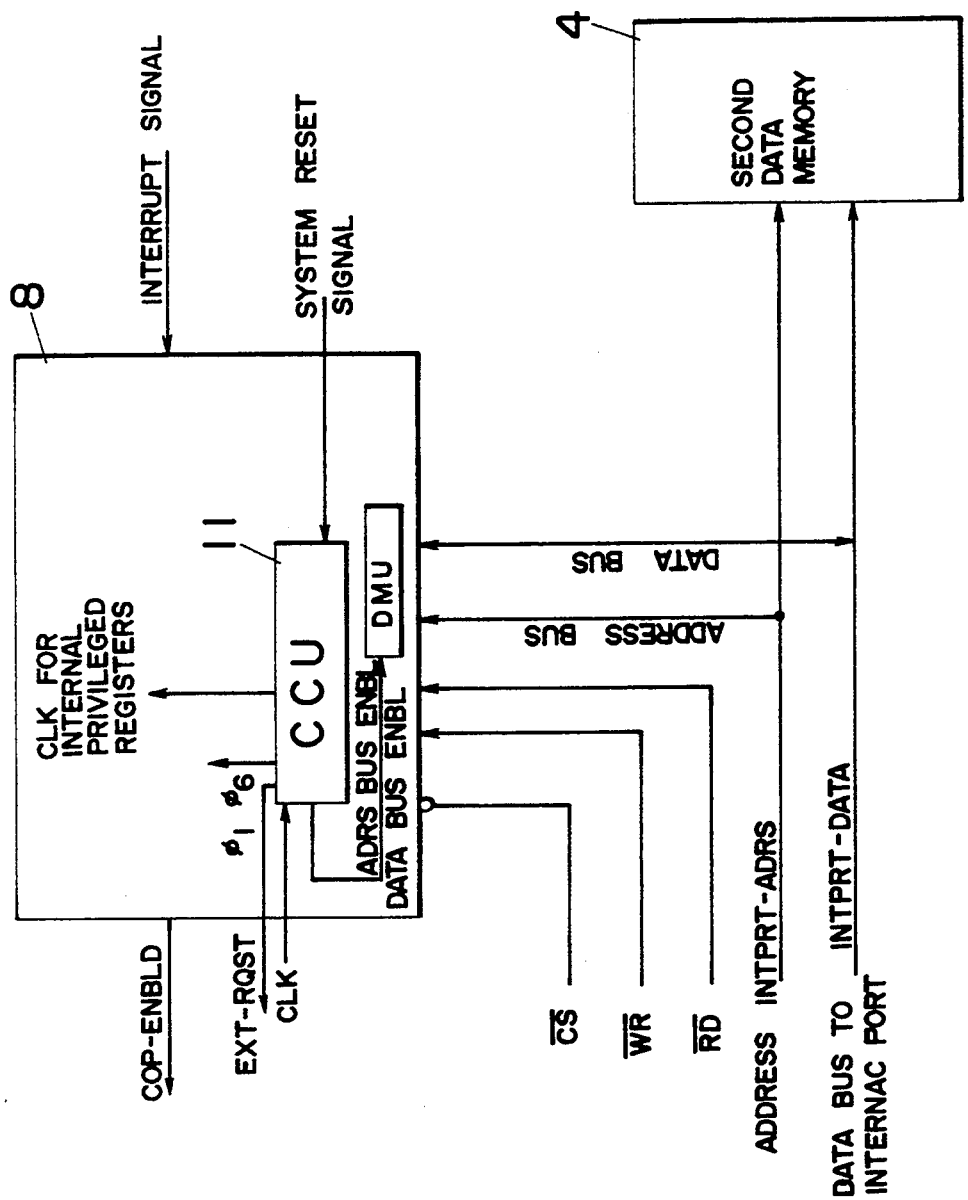
FIG. 10 is a main processor-coprocessor interface of the system of FIG. 5.
Figure 11:
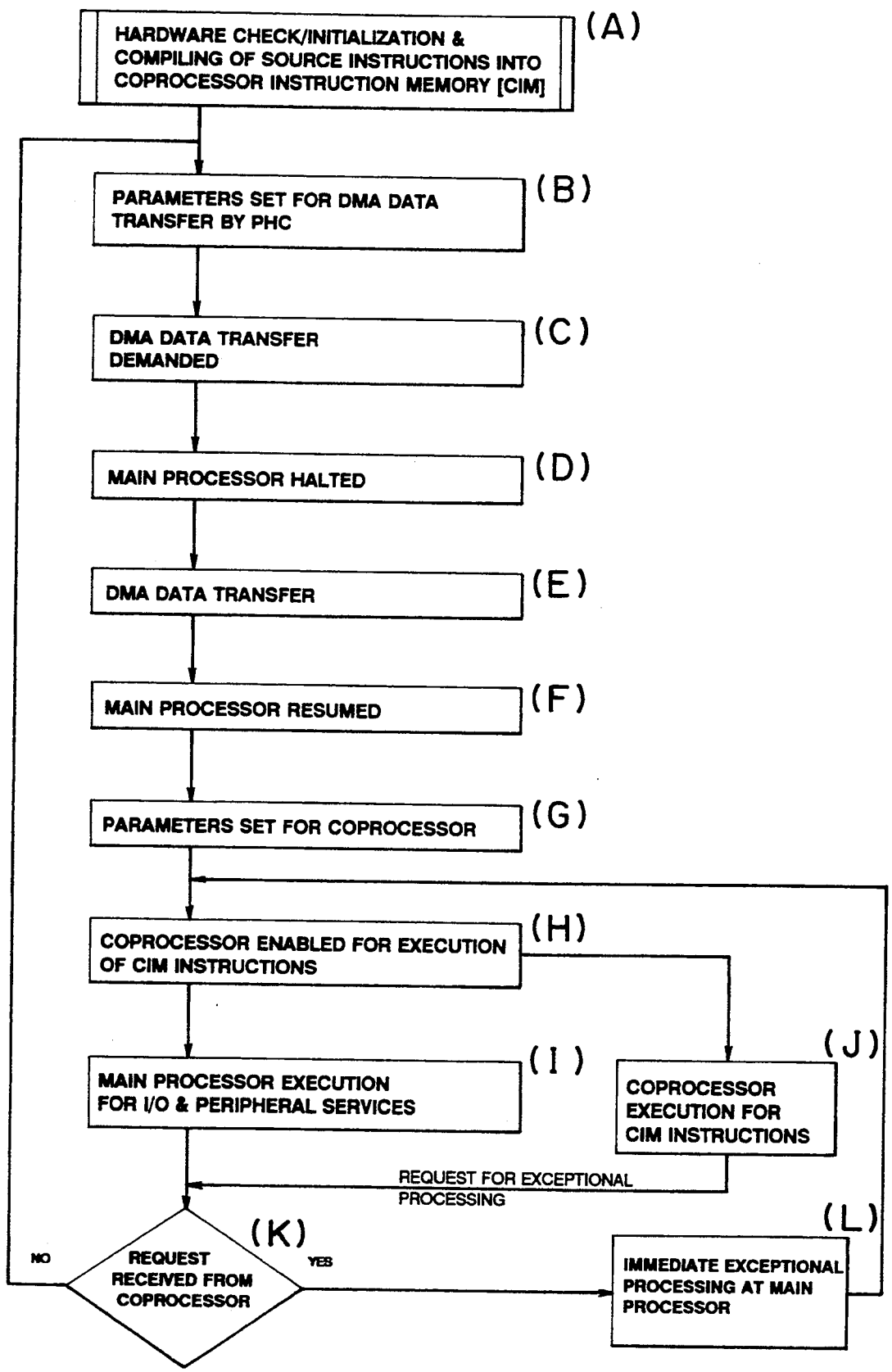
FIG. 11 is a system operational flow chart illustrating the operation of the system of FIG. 5.

FIG. 10 illustrates an interface between the coprocessor 25 and the main processor 20 in which the coprocessor 25 outputs to the main processor 20 an EXT-instruction task request signal (EXT-RQST) requesting to execute the extended instructions at the main processor 20 when the fetched instruction is so interpreted and an enabled signal (COP-ENBLD) indicating that the fetched instructions can be executed at the coprocessor 20. Externally input to the coprocessor 20 are clock CLK signal, system reset signal and interrupt signal one of the exceptional signals. Further, there are other external signals input to the coprocessor 20 including a chip-select signal $\overline{CS}$, write signal $\overline{WR}$, read signal $\overline{RD}$, internal port address signal INTPRT-ADRS and internal port data INTPRT-DATA for the coprocessor 25. As shown, the coprocessor 25 can have address and data transfer between the DMU 90 and the data memory 26 through address and data buses.

Figure 12:
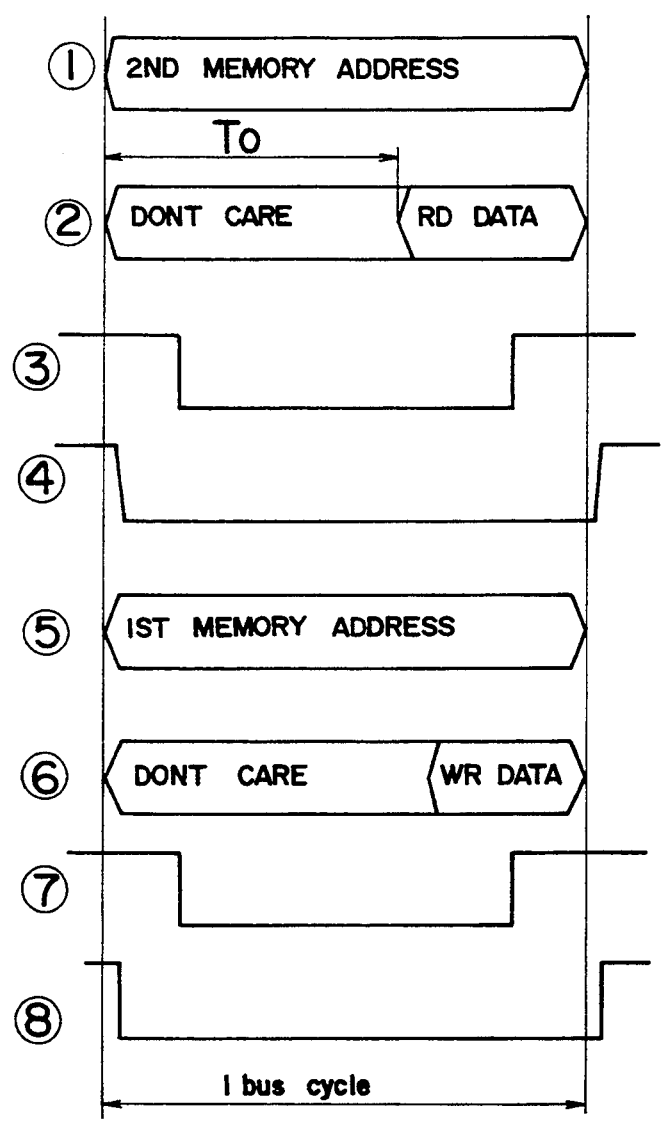
FIGS. 12 and 13 are timing and operational charts illustrating the memory transfer between system and data memories in the system of FIG. 5.
Figure 13:
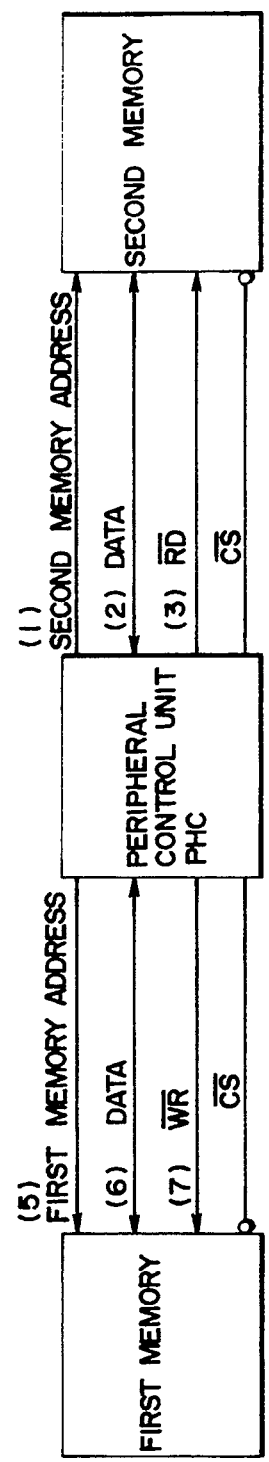

Now referring to FIGS. 11 to 15, the operation of the programmable controller will be discussed. At the first scan cycle, hardware check and are performed followed by compiling of the source program from the source instruction memory SIM 23 and storing the compiled program into the coprocessor instruction memory CIM 24 (step A of FIG. 11). This step is performed only at the very start of the operation. Then, the main processor 20 sets necessary parameters for effecting the DMA data transfer by the peripheral controller [PHC] 27 (step B). These parameters include the designation of destination memory, first address thereof, designation of source memory, first address thereof and the number of words to be transferred. Such DMA transfer is unidirectional in nature and therefore bidirectional DMA transfer could be made sequentially by the provision of two DMA units in the PHC 22. In this case, the parameters are set separately with regard to the individual DMA units. After the parameters are set, the main processor 20 issues a DMA demand to the PHC 22 (step C). Upon receiving the DMA demand, the PHC 27 issues a request for using the buses by which the main processor 20 is halted to release the requested buses (step D). After confirming that the buses are released by the main processor 20, the PHC 27 performs the DMA data transfer (step E). The DMA data transfer enables it to transfer one word memory within one bus cycle. For example, the DMA data transfer from the data memory 26 to the system memory 22 is effected as shown in FIGS. 12 and 13. That is, firstly the PHC 27 sends to the data memory 26 a read address [1], a chip select signal $\overline{CS}$ [4] and read signal $\overline{RD}$ [3]. After an elapse of memory access time T0, the data is read from the data memory 26 and is transferred to the PHC 27 [2]. While on the other hand, the PHC 27 sends to the system memory 22 a write address [5], a write address [5], a chip select signal $\overline{CS}$ [8] and write signal $\overline{WR}$ [7]. Finally, the data read from the data memory 26 is transferred to and written into the system memory [6]. Subsequent to the DMA transfer of the data common to the main processor 20 and the coprocessor 25, the main processor 20 is resumed to provide parameters to the internal privileged resisters for setting the CIM-PC 31 of the IFU 30 and operation modes of the coprocessor 25 before proceeding to the execution (step F). It is noted at this time that the coprocessor 25 will halt upon receiving a system reset signal and set a bus release flag to release the buses. The condition as to the coprocessor 25 is halted or active can be judged by the enabled signal COP-ENBLD from the coprocessor 25. While the coprocessor 25 is halted, the main processor 20 can access to the internal privileged registers in the coprocessor 25. The internal registers may have common addresses to the data memory 26 such that, when the coprocessor 25 is halted, the CCU 40 can generate clock signals for selecting, writing and reading the internal privileged registers based upon the decoding function of the address bus in cooperation with the chip select signal $\overline{CS}$, the write signal $\overline{WR}$ and the read signal $\overline{RD}$.

After setting the parameters to the internal privileged registers, the main processor 20 generates an enable request to enable the coprocessor 25 (steps G & H). The CCU 40 acknowledges the start request with the decoded address plus the chip select signal $\overline{CS}$, and sets a flag for activating the enabled signal COP-ENBLD from the coprocessor 25. Then, the coprocessor 25 proceeds to start pipelining of instruction fetch, decode, and instruction execution of the CIM 24 in accordance with the predetermined schedule of the program counter CIM-PC 31 (step J). FIG. 14 illustrates a timing chart for the above starting sequence initiated by the start request from the main processor 20. The start request shown at FIG. 14E is followed by the chip select signal $\overline{CS}$ (FIG. 14F) and a data bus enable signal (FIG. 14K). These signals are latched in an internal latch of the CCU 40 to produce a latch signal (FIG. 14G), after which the enabled signal COP-ENBLD (FIG. 14I) goes high "H" to bring the coprocessor 25 from the hold state into the active state. FIG. 14A indicates a clock signal CLK, FIG. 14B indicates the system reset signal, FIG. 14C an internal reset signal of the coprocessor 25, and FIG. 15D indicates phases $\phi1$ to $\phi6$ determining the one bus cycle. The first bus cycle after the enabled signal COP-ENBLD goes high is provided as a clock and bus select scheduling cycle. It is not until phase $\phi5$ that the content of the CIM-PC 31 is not output to initiate the instruction fetch, which occurrence is indicated by an address enable signal (FIG. 14J) output from the coprocessor 25 for the coprocessor instruction memory 24 as well as the data memory 26. In the clock and bus select scheduling cycle, the CIM-PC 31 is halted (PCHLT) to disable its increment in accordance with a program counter status and decoding status of the coprocessor 25, as shown in FIG. 14N, at the same time the instruction fetch is inhibited (FinH). Subsequently, the coprocessor 25 proceeds into an operation initiating cycle M1 in which the instruction fetch is enabled (FEN) and the CIM-PC 31 is incremented (PCinc) as shown in FIG. 14L. At this occurrence, the decoded information from the BPU 50 or the MPU 60 is made invalid (DinH) with respect to the bus status and control status of the coprocessor 25, as shown in FIG. 14M. Thereafter, the sequence proceeds into a normal operation cycle in which instruction decode is enabled (DEN) to provide information upon which the next instruction fetch and increment of the CIM-PC 31 are judged. The decoded instruction is executed (EEN) in the next cycle.

While the coprocessor 25 executes the instruction, the main processor 20 operates in parallel or concurrently therewith to process the I/O service and peripheral service (step I of FIG. 11), during which the updated I/O data are temporarily stored in the system memory 22. Upon receiving a request for the exceptional instruction execution from the coprocessor 25 within the parallel processing period, the main processor 20 will read the requested information from the internal privileged registers of the coprocessor 25 for immediate processing thereof (step L), such request for the exceptional instructions being acknowledged as an interrupt signal to the main processor 20. The coprocessor 25 having sent the request, on the other hand, is halted to release the buses available for operation of the main processor 20. In addition to the above exceptional instruction request, there are some other task requests which are issued from the coprocessor 25 to be processed at the main processor 20. These exceptional instruction includes, in addition to the EXT-instructions, execution errors and an external interrupt during the execution of the coprocessor 25. Upon occurrence of such exceptional instructions or events, the coprocessor 25 sets the bus release flag, as shown in FIG. 15C, which is taken as the exceptional instruction request signal to the main processor 20, and the coprocessor 25 waits to the completion of the current instruction execution and then turns the enabled signal CO-ENBLD from "H" to "L" in the following cycle, as shown in FIG. 15G, releasing the buses and being turned into "halted" state from the "active" state. FIG. 15A shows a clock signal, FIG. 15B shows a phase, FIG. 15D shows a start latch for the coprocessor 20, and FIGS. 15E and 15F show address bus enable and data bus enable signals, respectively.

When the coprocessor 25 acknowledges an end instruction corresponding to the end of the user program, it will sets an end flag for all the executions and stops to release the buses. At this time, the coprocessor 25 also issues an end signal in response to which the main processor 20 acknowledges the end flag and returns to the DMA data transfer (step K of FIG. 11).

Figure 1:
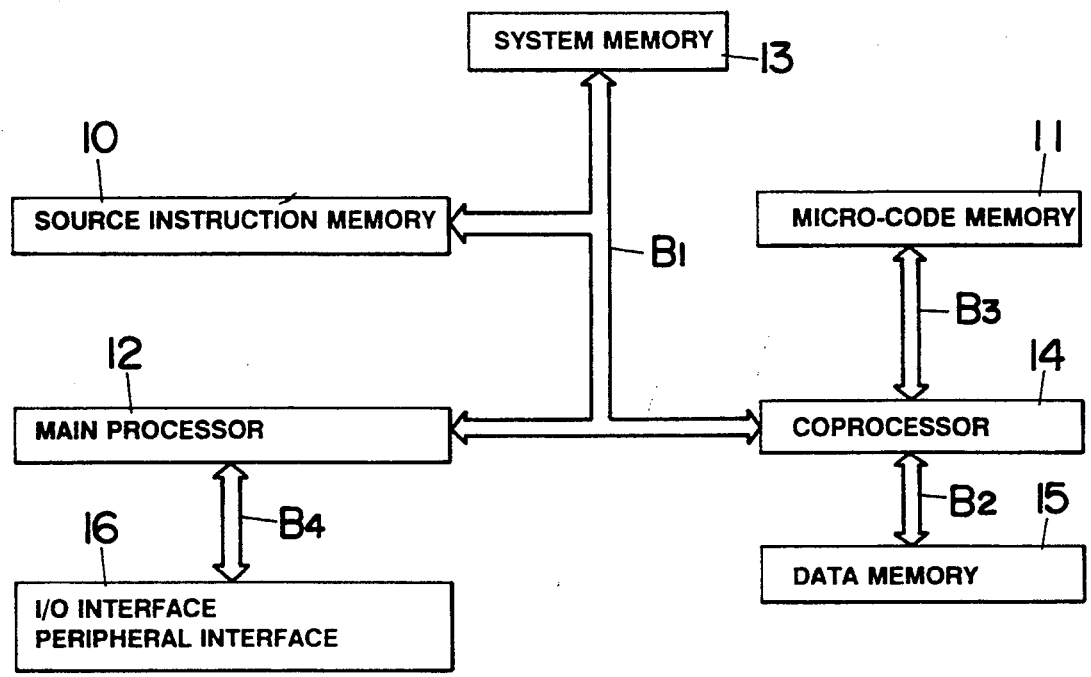
FIG. 1 is a block diagram illustrating a system configuration of a prior art programmable controller.
Figure 2:
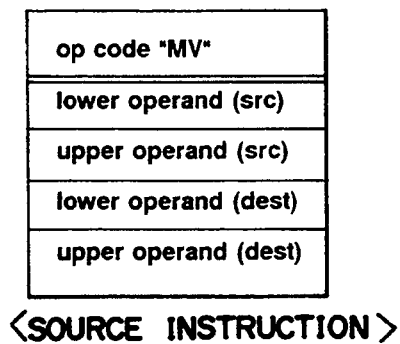
FIG. 2 shows a source instruction, for example, with regard to a [MV] instruction utilized in the prior programmable controller of FIG. 1.

Now, the discussion is made to the pipeline execution of the move instruction "MV", for example, in the present invention for a comparative purpose with the prior art. The "MV" instruction composed of five 16-bit words in the source language is compiled into two 32-bit words instructions in the object language, i.e., "LD" instruction and "STOR" instruction, as shown in FIGS. 16A and 16B. The timing chart for the pipeline execution is shown in FIG. 17 in which the LD instruction is prefetched [1st pipeline stage] in the preceding cycle of executing the previous instruction and therefore the instruction fetch is not counted in the total bus cycles for execution of the MV instruction for the same reason as discussed in the prior art controller with reference to FIG. 2 in which the op code is fetched in parallel with the execution of the previous instruction. The fetched LD instruction is decoded [2nd pipeline stage] in the subsequent cycle during which the next STOR instruction is prefetched. At the next bus cycle, the LD instruction is executed to load the data from memory [3rd pipeline stage] in parallel with the decode of the STOR instruction. The STOR instruction execution of storing the loaded data to the memory can be performed in the next cycle. Consequently, it is confirmed that the MV instruction can be performed only in two bus cycles, which is greatly reduced cycles as compared to the prior art processing.

It is noted at this time that with the present invention incorporating the RISC concepts with a set of reduced instructions each comprising 32-bits, it is readily possible to reduce the bit area for the op code, thereby retaining a memory access space greater than that occupied by the operand of the source code instruction for the prior art controller. It is also rendered possible to execute the most of the instructions in the same pipeline stages as shown in FIG. 20, which gives rise to coherent pipelining for enhanced efficiency. This is also advantageous to make the pipeline operation less influenced with the exceptional information such as interrupt or branch, thereby keeping the execution loss at a minimum, in addition to keep the number of pipeline stages at a minimum. Further, since no instruction queue or FIFO is required, it is possible to simplify the hardware requirement, thereby enabling a highly efficient pipelining as well as to simplify the compiler.

In view of that most of the basic instructions can be written to include an op code and operand in one source code and therefore can be executed in a hardware logic, and further assuming that the user program generally is made of 50% of basic instructions and 50% of the applied instructions, an average bus cycles will be four in the prior art controller where the applied instruction is executed in 7 bus cycles. In contrast to this, the present invention can have reduced average bus cycles of 2 even if the applied instruction should require 3 bus cycles greater than the actual ones. Therefore, the superiority of the present invention over the prior art can be also confirmed in reducing the number of the average bus cycles. Further, the memory access in the one bus cycle involves only access to the coprocessor instruction memory 24 and the data memory 26 which are realized by RAM and does not involve a microcode access as required in the prior art controller, which enables the use of a RAM cache memory or high-speed SRAM and therefore greatly reducing the one bus cycle.

The above parallel processing can be shown in the diagram of FIG. 18. As discussed in the above, not only because of that the average number of the bus cycles are reduced to half of that required in the prior controller for execution of one instruction, namely from 4 bus cycles to 2 bus cycles, but also because of the parallel processing, the total scan time can be greatly reduced for execution of the instruction in the present invention even with the addition of the DMA data transfer. That is, the DMA data transfer can be made in a very short time relative to the instruction execution. For example, the DMA is capable of transferring 1 word (=16 bits) in 125 nsec between the system memory 22 and the data memory 26, and therefore total DMA data transfer is completed in only 0.5 msec for transferring of 4K words data, which is enough in consideration of the number of the I/O devices and the peripheral devices expected in the normal system configuration, while the instruction execution is generally expected to be performed in 4 msec. Consequently, when the I/O service and peripheral services are performed in 3 msec as discussed in the prior art configuration of FIG. 3, the total scan time for completion of one instruction is to be 4.5 msec (0.5 msec for DAM transfer+4 msec for instruction execution at the coprocessor 25), which is less than half of 11 msec required in the prior art controller (3 msec for I/O & peripheral services+8 msec for instruction execution). It is therefore confirmed that the present invention can complete one instruction in a reduced scan time far less than that of the prior art controller. When the I/O and peripheral serves at the main processor 20 are finished before the instruction execution at the coprocessor 25 as in the above example, the main processor 20 will wait for receiving an execution end signal [2] of FIG. 18. In the opposite case when the coprocessor 25 finishes the instruction execution before the end of the I/O and peripheral services at the main processor 20, the coprocessor 25 will issues the execution end signal [2] and wait, at which condition the memory buses are released. When the main processor 20 receives the execution end signal after finishing the I/O and peripheral services with the use of the system memory 22, it completes one scan cycle and returns to the next DMA data transfer. The DMA data transfer is performed as discussed in the above with reference to FIG. 13. After the DMA data transfer, the main processor 20 will issue a start execution signal [1] of FIG. 18 to the coprocessor 25 to start the execution of the next instruction.

Figure 19:
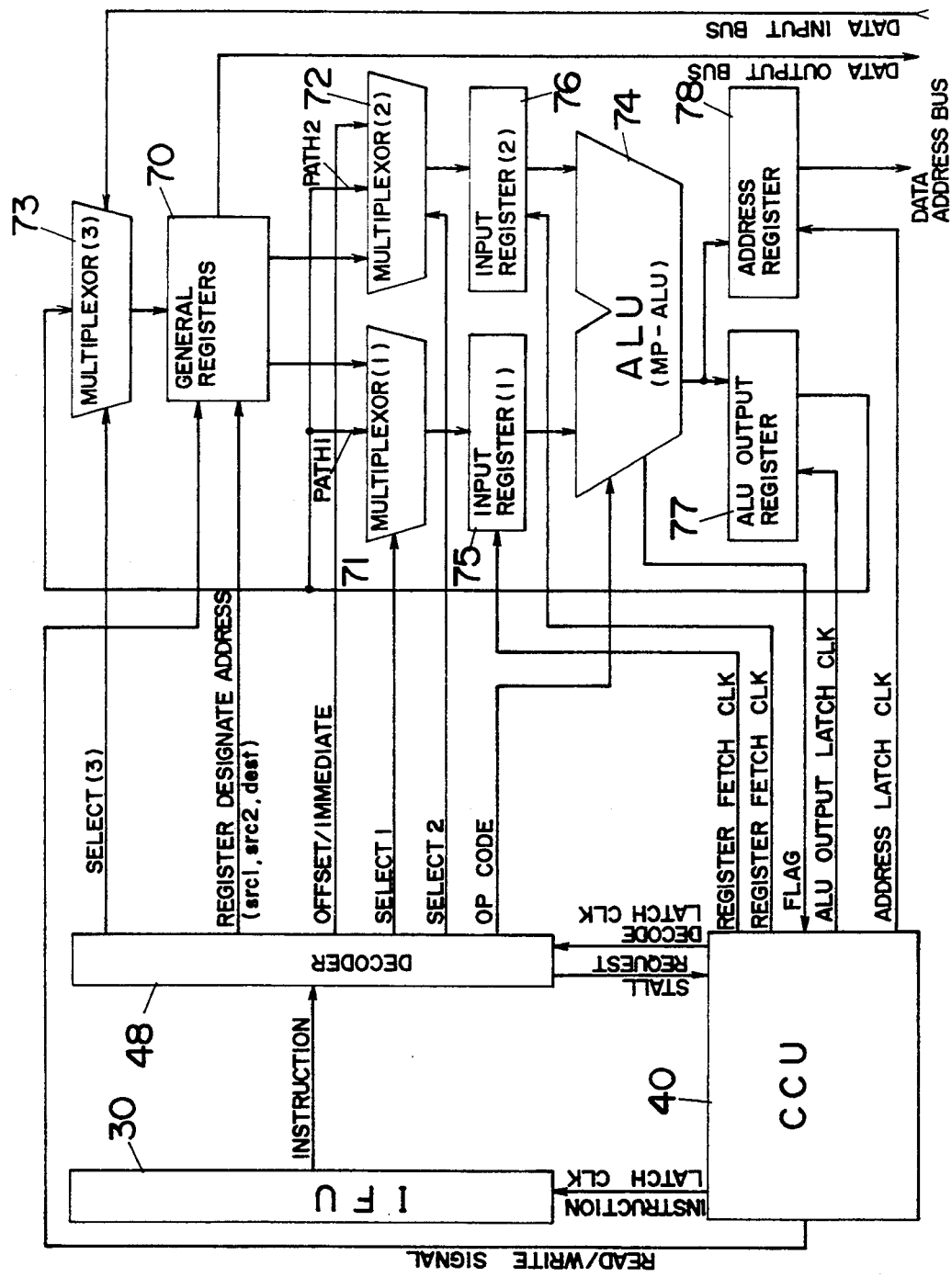
FIG. 19 is a pipelining diagram for an MPU of FIG. 8.

Referring to FIG. 19, there is shown a detailed block diagram for an enhanced pipeline operation effected in the MPU 60 for the series of the applied instructions. In the present invention, the applied instruction is completed in 3 stages or cycles which, as shown in FIG. 20, consists of instruction fetch, decode in which the instruction is decoded accompanied with register fetch as well as ALU operation, and memory/register access which includes write back of the registers. These applied instructions having the general instruction format of FIG. 6B are further grouped into several types according to their operations, as shown in FIGS. 21A to 21D. The classification as to which applied instructions are classified into M-type (memory access), R-type (register), I-type (immediate) and J-type (jump) is shown in the following Table 1. Among the J-type instructions in Table 1, "BPU" and "CNTRL" instructions have corresponding formats of FIGS. 6A and 6C, respectively.

TABLE 1

| Type | Instruction | OP-code | Operation |
|---|---|---|---|
| M | LOADWR | 000000 | Load Word Right |
|  | LOADWRZ | 000001 | Load Word Right with Zero on left |
|  | LOADWL | 000010 | Load Word Left |
|  | LOADWLZ | 000011 | Load Word Left with Zero on right |
|  | STOREWR | 000100 | Store Word Right |
|  | STOREWL | 000110 | Store Word Left |
|  | PLOADWRZ | 001001 | Pulse Load Word Right with Zero on left |
|  | PLOADWLZ | 001011 | Pulse Load Word Left with Zero on right |
| R | AND | 010000 | And |
|  | OR | 010001 | Or |
|  | XOR | 010010 | Exclusive Or |
|  | ADD | 010011 | Add |
|  | SUB | 010100 | Subtract |
|  | BIT | 010101 | BIT operation (set,reset,invert) |
|  | SL | 010110 | Shift Left |
|  | SR | 010111 | Shift Right |
|  | BIN | 011000 | BCD to BIN conversion |
|  | BCD | 011001 | BIN to BCD conversion |
|  | MULT | 011010 | Multiply |
|  | DIV | 011011 | Divide |
| I | ANDI | 100000 | And Immediate |
|  | ORI | 100001 | Or Immediate |
|  | XORI | 100010 | Exclusive Or Immediate |
|  | ADDI | 100011 | Add Immediate |
|  | SUBI | 100100 | Sub Immediate |
|  | SLI | 100110 | Shift Left Immediate |
|  | SRI | 100111 | Shift Right Immediate |
|  | PORI | 101001 | Pulse Or Immediate |
|  | PADDI | 101011 | Pulse Add Immediate |
| J | BE | 110000 | Branch on Equal |
|  | BNE | 110001 | Branch on Not Equal |
|  | BGE | 110010 | Branch on Greater than or Equal |
|  | BG | 110011 | Branch on Greater than |
|  | BLE | 110100 | Branch on Less than or Equal |
|  | BL | 110101 | Branch on Less than |
|  | JAL | 111000 | Jump And Link |
|  | JR | 111001 | Jump Register |
|  | FLGSET | 111100 | Set Flags |
|  | NOP | 111101 | No Operation |
|  | BPU | 111110 | Bit Processing Unit Instruction |
|  | CNTRL | 111111 | Main Controller Instruction |

The M-type instructions refer to an instructions for memory access and therefore includes only load and store instruction, and comprises 6-bits operation code "op code", 3-bit index modification register designating address "src1" and 16-bits "offset". General registers 70 utilized in the configuration of FIG. 19 includes zero register Ro and registers R1 to R7 to which "src1" and "dest" are assigned. When the zero register is assigned to "src1", an absolute address mode is realized. For execution of the M-type instruction, one of the general registers 70 designated by the "src1" code in the RF sub-stage simultaneously with the instruction decode [DEC] is selected to have its content passed through a multiplexor [1] 71 and latched into an input register [1] 75. At the same time, "offset" is selected through multiplexor [2] 72 and latched into an input register [2] 76. At the ALU sub-stage, an op code is treated as addition to provide the addition of the contents of the input registers [1] and [2] at an ALU 74, the result of which is then latched into an address register 78 as an effective address with index modification. In the following MEM sub-stage, addressed data in the memory appears in a data input bus when the "load" instruction is selected. In the final WB sub-stage, the data input bus is selected at a multiplexor [3] 73 to load the corresponding data into one of the general registers 70 designated by the "dest" code. On the other hand when "store" instruction is selected, the content of one of the general registers 70 designated by "dest" code at the first sub-stage of MEM is send to a data output bus at the MEM sub-stage and is then written back into the addressed memory at the last sub-stage of MEM.

The R-type instructions refer to an instruction for operation between the registers designated respectively by "src1" and "src2", the result of which is stored in a register designated by "dest". The "function" code may includes an extended operations, in addition to the logical "AND" and "OR" operations. For execution of the R-type instruction, two of the general registers 70 designated respectively by "src1" and "src2" codes at the RF sub-stage are selected through the multiplexors [1],[2] 71,72 to have their contents stored respectively into the input registers [1], [2] 75 and 76. At the subsequent ALU sub-stage, an decoded operational code is fed to the ALU 74 where a necessary operation is made between the contents of the input registers [1], [2] 75 and 76, the result of which is output to an ALU output register 77. No substantial operation is performed in the subsequent first sub-stage of MEM, and the content of the output register 77 is written back into one of the general registers 70 designated by the "dest" code in the final sub-stage WB.

The I-type instructions refer to an instruction for operation between an value of "intermediate" and the content of a register designated by "src1". For execution of I-type instruction, the same operations are performed as in the R-type instruction except that the "immediate" is stored in the input register [2] 76 and immediately processed at the ALU 74.

The J-type instructions refer to relative and absolute branch instructions and some other special instructions. As to the relative branch instruction, the values of the registers designated by "src1" and "src2" are compared to effect branch, i.e, to alter the value of a corresponding program counter when a condition is satisfied. The branch destination is obtained by the addition of a current count in the program counter and the value given by "target". The branch condition includes "equal", "not equal", "greater than or equal to", "greater than", "less than" and "less than or equal to". The absolute branch instruction include a jump-register instruction which jumps to an address of a register designated by "src1" or "src2", an jump-link instruction which stores a current program address into registers designated by "src1" or "src2" and jumps to a program address designated by "target" value. The special instructions include a bit processing instruction inherent to the sequence control of the programmable controller and a no-op instruction. To execute the relative branch instruction, for example, the same processing is made at the RF sub-stage as in the R-type instruction. In the ALU substage, subtraction is carried out at the ALU 74 to provide a flag output which is judged by a branch condition to modify the program counter (not shown in FIG. 19) which is provided with an adder for computation of a branch destination address.

Figure 22:
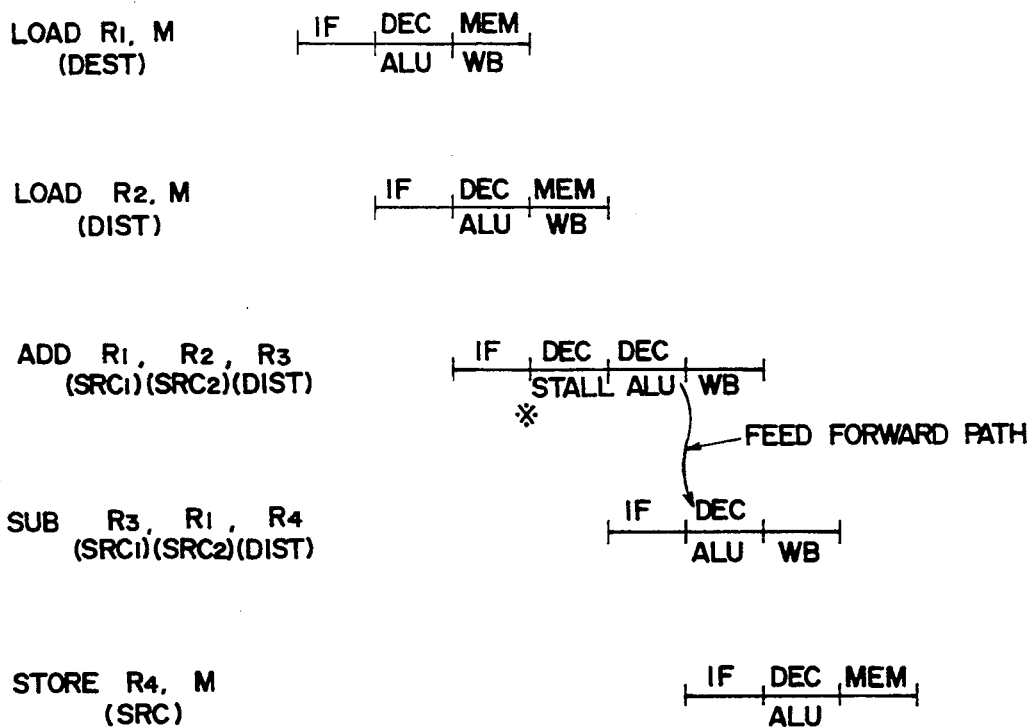
FIG. 22 is a MPU pipeline state, for example, of particular instruction sequence.

FIG. 22 shows a particular sequence of the applied instructions which may be seen in the program. As illustrated, when the second "LD" instruction (M-type) is immediately followed by the "ADD" instruction (R-type), there would be a conflict in using the general registers 70 of FIG. 19 that one register R2 in the general registers 70 which is used as "dest" register for the "LD" instruction is to be also used as "src2" register for the next "ADD" instruction. To avoid such conflict, the present invention is contemplated to insert a hardware stall before the second stage of the "ADD" instruction as temporarily stalling the pipelining so that the only DEC is performed in the stalled stage to defer the following operations by one stage. Further, when the "SUB" instruction immediately follows the "ADD" instruction, as seen in the next sequence in the figure, there is another conflict in the general registers 70 that another register R3 defined in the general register 70 is being used as "dest" register for the "ADD" instruction and is also to be used as "src1" register for the "SUB" instruction. To avoid this conflict, it is also contemplated to pass the contents of an output register 77 to one of input registers 77 and 78 to be immediately available by the ALU 74 for operation of the "SUB" instruction.

Figure 23:
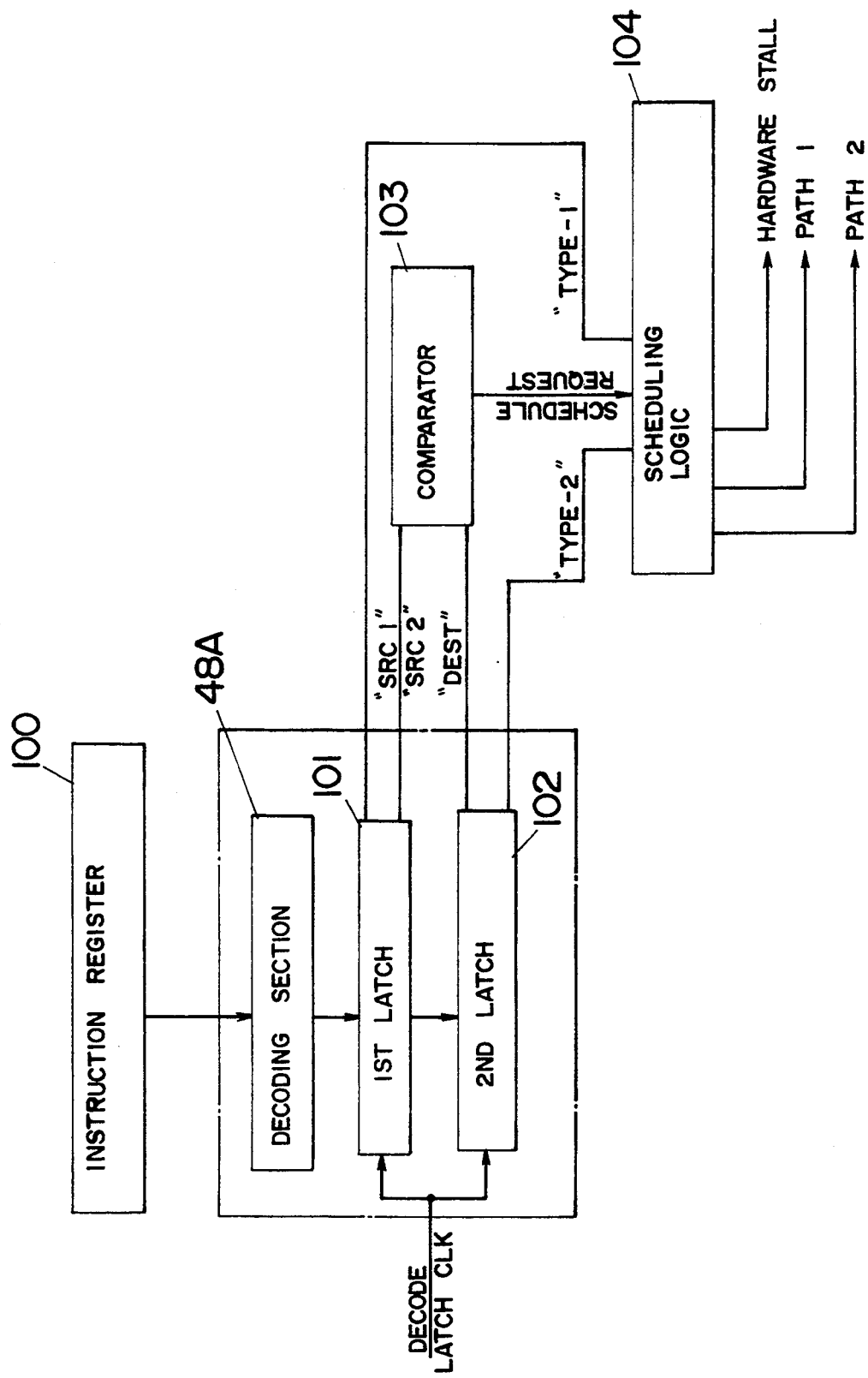
FIG. 23 is a pipeline stall & feed forward path generating circuit in a decoder of the system of FIG. 19.

The above hardware stall and the inter-register data pass can be effected by a pipeline scheduling circuit of FIG. 23. The circuit is included in a decoder 48 of FIG. 19 and comprises an instruction register 100 storing a fetched instruction, a decoding section 48A decoding the instruction, and a pair of first and second decode latches 101 and 102 into which the two successive decoded instructions (currently being executed and the next) are latched such that the next instruction is always latched in the first latch 101 while the current instruction is kept in the second latch 102 with the continuous shifting of the decoded instruction from the first to the second. The first latch 101 provides "SRC1" and/or "SRC2" signal giving information as to the particular general registers 70 to be designated by "src1" and/or "src2" code in next instruction, and at the same time a "TYPE-1" signal indicative of that the next instruction is of R-, I- or J-type. While the second latch 102 provides a "DEST" signal giving information as to the particular general registers 70 to be designated by "dest" code in the current instruction, and at the same time a second "TYPE-2" signal indicative of that the current instruction is of M-, R- or I-type. The "SRC1" and/or "SRC2" signals are fed together with "DEST" signal to a comparator 103 which judges based thereupon whether there is a conflict in one of the general registers 70 between the two successive instructions and output a scheduling request signal to a scheduling logic 104 to which the "TYPE-1" and "TYPE-2" signals are fed. Upon receiving the scheduling request signal, the logic 104 judges in consideration of the relations between the types of the two successive instructions to select the hardware stall or pass the content of the output register 77 to one of the input registers 71 and 72 through feed forward path 1 or path 2 indicated in FIG. 19. When the hardware stall is selected, the decoder 48 issues a stall request to the CCU 40 for delaying on stage or cycle. The above judgment is made in accordance with the conditions shown in the following Table 2.

TABLE 2

| current instruction | next instruction | general registers | results |
|---|---|---|---|
| M-type [DEST] | R-type, I-type or J-type (relative branch) [SRC1/SRC2] | DEST = SRC1 DEST = SCR2 | hardware stall |
| R-type I-type [DEST] | R-type, I-type or J-type (relative branch) [SRC1/SRC2] | DEST = SRC1 DEST = SRC2 | path 1 path 2 |

What is claimed is:

1. A programmable controller for controlling I/O devices and peripheral devices in a programmed manner, said controller comprising:
   a main processor for controlling said I/O and peripheral devices;
   a system memory storing an operating system and providing a work area for said main processor;
   a source instruction memory storing a source program including instructions for control of said I/O and peripheral devices;
   a coprocessor instruction memory storing a program which is compiled from said source program by said main processor to have reduced instructions corresponding to said instructions of said source program;
   a coprocessor receiving said reduced instruction from said coprocessor instruction memory to execute the instructions without relying on microcodes in a pipeline mode and in parallel with the control operation of said I/O and peripheral devices by said main processor to effect parallel processing;
   a data memory utilized in the instruction execution for data processing by said coprocessor; and
   a peripheral controller operatively interconnecting said main processor and said coprocessor, said peripheral controller having address and data buses associated respectively with said main processor and said coprocessor such that it can transfer data directly between said system and data memory by a direct-memory access prior to the start of said parallel processing and separate said buses with said main processor from those with said coprocessor upon completion of said DMA data transfer to enable said parallel processing at said main processor and said coprocessor;
   wherein said coprocessor comprises a bit processing unit (BPU) which executes basic instructions requiring a single bit processing including logical operation for a relay sequence control and a multibit processing unit (MPU) for execution of applied instructions requiring a multibit processing for handling memory data, said MPU being configured to process said applied instructions on a word-by-word basis such that both of said basic and applied instructions can be executed commonly in the same pipeline procedure.

2. A programmable controller as set forth in claim 1, wherein said peripheral controller is capable of effecting said DMA data transfer within one bus cycle.

3. A programmable controller as set forth in claim 1, wherein said pipeline procedure comprises the following three stages each completed in one machine cycle:
   a 1st stage in which an instruction fetch is performed with regard to said basic instruction or applied instruction;
   a 2nd stage in which decoding is performed with regard to said basic instruction and said applied instruction and in which register fetch as well as register operation are made for the applied instruction at said MPU; and a 3rd stage in which said basic instruction is executed said reduced instruction is executed between registers of said BPU and said data memory and in which said applied instruction is executed with an access to said data memory or between registers of said MPU and said data memory.

4. A programmable controller for controlling I/O devices and peripheral devices in a programmed manner, said controller comprising:

a main processor for controlling said I/O and peripheral devices;

a system memory storing an operating system and providing a work area for said main processor;

a source instruction memory storing a source program including instructions for control if said I/O and peripheral devices;

a coprocessor instruction memory storing a program which is compiled from said source program by said main processor to have reduced instructions corresponding to said instructions of said source program;

a coprocessor receiving said reduced instruction from said coprocessor instruction memory to execute the instructions without relying on microcodes in a pipeline mode and in parallel with the control operation of said I/O and peripheral devices by said main processor to effect parallel processing;

a data memory utilized in the instruction execution for data processing by said coprocessor; and a peripheral controller operatively interconnecting said main processor and said coprocessor, said peripheral controller having address and data buses associated respectively with said main processor and said coprocessor such that it can transfer data directly between said system and data memory by a direct-memory access prior to the start of said parallel processing and separate said buses with said main processor from those with said coprocessor upon completion of said DMA data transfer to enable said parallel processing at said main processor and said coprocessor;

wherein said coprocessor includes an arithmetic and logic unit (ALU) with general registers storing information associated with said instruction, said coprocessor further including a hardware logic comprising comparator means and pipelining scheduling means, said comparator means comparing a current instruction with a following instruction fetched in the pipeline mode to provide a schedule-requiring output when these two succeeding instructions are determined to be in such a particular relation as to cause a conflict in using said general registers, said pipeline scheduling means, in response to said schedule-requiring output, providing an instruction to stall the cycle of executing said following instruction until said conflict is resolved.

5. A programmable controller for controlling I/O devices and peripheral devices in a programmed manner, said controller comprising:

a main processor for controlling said I/O and peripheral devices;

a system memory storing an operating system and providing a work area for said main processor;

a source instruction memory storing a source program including instructions for control of said I/O and peripheral devices;

a coprocessor instruction memory storing a program which is compiled from said source program by said main processor to have reduced instructions corresponding to said instructions of said source program;

a coprocessor receiving said reduced instruction from said coprocessor instruction memory to execute the instructions without relying on microcodes in a pipeline mode and in parallel with the control operation of said I/O and peripheral devices by said main processor to effect parallel processing;

a data memory utilized in the instruction execution for data processing by said coprocessor; and a peripheral controller operatively interconnecting said main processor and said coprocessor, said peripheral controller having address and data buses associated respectively with said main processor and said coprocessor such that it can transfer data directly between said system and data memory by a direct-memory access prior to the start of said parallel processing and separate said buses with said main processor from those with said coprocessor upon completion of said DMA data transfer to enable said parallel processing at said main processor and said coprocessor;

wherein said coprocessor includes an arithmetic and logic unit (ALU) with general registers, more than one input registers and an output register, said general registers storing information associated with said instruction said input registers storing information utilized for execution of said instruction by said ALU, and said output register storing the result of said instruction processed by said ALU, said coprocessor further including a hardware logic comprising comparator means and pipelining scheduling means, said comparator means comparing a current instruction with a following instruction fetched in the pipeline mode to provide a schedule-requiring output when these two succeeding instructions are determined to be in such a particular relation as to cause a conflict in using said general registers, said pipeline scheduling means, in response to said schedule-requiring output, transferring a content of said output register obtained by the execution of the current instruction by said ALU to one of said input registers to be immediately available in the execution of the following instruction by said ALU.

* * * * *